US012597745B2

(12) United States Patent
Endo et al.

(10) Patent No.: US 12,597,745 B2
(45) Date of Patent: Apr. 7, 2026

(54) ELECTRICAL CONNECTOR

(71) Applicant: MITSUMI ELECTRIC CO., LTD., Tokyo (JP)

(72) Inventors: Kazuma Endo, Tokyo (JP); Yuta Takano, Tokyo (JP); Hiroyuki Sadohara, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 321 days.

(21) Appl. No.: 18/528,179

(22) Filed: Dec. 4, 2023

(65) Prior Publication Data

US 2024/0213725 A1 Jun. 27, 2024

(30) Foreign Application Priority Data

Dec. 27, 2022 (JP) ................................ 2022-209271

(51) Int. Cl.
*H01R 24/40* (2011.01)
*H01R 103/00* (2006.01)

(52) U.S. Cl.
CPC ......... *H01R 24/40* (2013.01); *H01R 2103/00* (2013.01)

(58) Field of Classification Search
CPC .. H01R 24/40; H01R 2103/00; H01R 24/545; H01R 13/41; H01R 9/05; H01R 13/04; H01R 13/422
See application file for complete search history.

(56) References Cited

U.S. PATENT DOCUMENTS

| | | | | | |
|---|---|---|---|---|---|
| 6,045,402 | A * | 4/2000 | Embo | H01R 24/50 | 439/561 |
| 7,465,190 | B2 * | 12/2008 | Henningsen | H01R 24/40 | 439/578 |
| 7,766,696 | B2 * | 8/2010 | Conner | H01R 13/518 | 439/581 |
| 8,298,005 | B2 * | 10/2012 | Annequin | H01R 24/50 | 439/63 |
| 8,430,675 | B2 * | 4/2013 | Hardy | H01R 12/724 | 439/63 |
| 9,692,168 | B1 * | 6/2017 | Schroll | H01R 12/721 | |
| 2022/0311192 | A1 * | 9/2022 | Endo | H01R 24/50 | |
| 2024/0186741 | A1 * | 6/2024 | Endo | H01R 13/46 | |
| 2024/0213725 | A1 * | 6/2024 | Endo | H01R 13/41 | |
| 2024/0429635 | A1 * | 12/2024 | Akaike | H01R 13/04 | |
| 2024/0429661 | A1 * | 12/2024 | Akaike | H01R 43/0263 | |
| 2025/0023304 | A1 * | 1/2025 | Akaike | H01R 13/6581 | |

FOREIGN PATENT DOCUMENTS

JP 2022149019 A 10/2022

* cited by examiner

*Primary Examiner* — Abdullah A Riyami
*Assistant Examiner* — Nader J Alhawamdeh
(74) *Attorney, Agent, or Firm* — McCoy Russell LLP

(57) ABSTRACT

An electrical connector includes at least one contact pin, and at least one insulating housing for containing the at least one contact pin therein. The at least one contact pin includes a horizontally extending portion, at least one protruding portion extending from a side portion of the horizontally extending portion in the at least one housing in a width direction perpendicular to the insertion and extraction direction of the mating connector. The at least one housing includes a cylindrical portion and at least one pressing rib formed on an outer peripheral surface of the cylindrical portion and formed at a position corresponding to the at least one protruding portion of the at least one contact pin.

12 Claims, 30 Drawing Sheets

ELECTRICAL CONNECTOR

CROSS-REFERENCE TO RELATED APPLICATION

The present application claims priority from Japanese Patent Application No. 2022-209271 filed on Dec. 27, 2022. The entire contents of the above-listed application are hereby incorporated by reference for all purposes.

TECHNICAL FIELD

The present disclosure generally relates to electrical connectors, in particular to an electrical connector used for providing a coaxial connection with a coaxial cable.

BACKGROUND ART

In order to provide an electrical connection between an electronic device and another electronic device through a cable, a combination of a receptacle connector and a plug connector has been widely used. Further, an amount of data transmitted from the electronic device to the other electronic device through the cable has increased as processing capacity of the electronic devices has been improved in recent years. In order to transmit a large amount of data in a short time, it is necessary to transmit a high-frequency signal through the cable. Thus, there are needs of improving signal transmission characteristics of the cable, particularly, signal transmission characteristics of the cable in a high-frequency band. In order to address such needs, a coaxial cable having superior signal transmission characteristics in the high frequency band has been widely used. As is well known, the coaxial cable has a coaxial structure in which a core wire for transmitting a signal, an inner insulator layer covering the core wire, an outer conductor layer (a braid layer) covering the inner insulator layer and serving as a ground earth when the signal is transmitted and a shield for preventing leak of the signal to the outside and penetration of radio waves from the outside, and an outer insulator layer covering the outer conductor layer are concentrically arranged.

In order to provide a coaxial connection with the above-mentioned coaxial cable, there has been widely used an electrical connector including a contact pin which should be electrically connected to the core wire of the coaxial cable, an insulating housing covering the contact pin and an outer contact which covers the housing and should be connected to the outer conductor layer of the coaxial cable. For example, patent document 1 discloses a housing 10 and a contact pin 11 typically used in the above-mentioned electrical connector as shown in FIG. 1. The housing 10 is an L-shaped member including a cylindrical portion 101 extending in a longitudinal direction thereof and a downwardly extending portion 102 extending from a base end portion of the cylindrical portion 101 toward the lower side. An insertion hole 103 is formed in the cylindrical portion 101 of the housing 10 so as to pass through the cylindrical portion 101 in the longitudinal direction (the Z direction). The contact pin 11 includes a horizontally extending portion 111 which linearly extends in the longitudinal direction and is held in the cylindrical portion 101 of the housing 10, a contact portion 112 which protrudes from a tip end portion of the horizontally extending portion 111 toward the tip side and should be contacted with a corresponding contact pin of a mating connector, a connection portion 113 which is curved from a base end portion of the horizontally extending portion 111 so as to extend toward the lower side, a downwardly extending portion 114 extending from a lower end portion of the connection portion 113 toward the lower side, a terminal portion 115 which is formed at a lower end portion of the downwardly extending portion 114 and should be connected to a corresponding terminal of a circuit board, a pair of press-fitting shoulders 116 respectively extending from both side portions (both side surfaces in the X direction) of the base end portion of the horizontally extending portion 111 in the width direction of the contact pin 11 (the X direction and the outer side) perpendicular to the longitudinal direction and a pair of protruding portions 117 which extend from both side portions of the contact pin 11 which is held in the cylindrical portion 101 of the housing 10 in a width direction perpendicular to an insertion and extraction direction of the mating connector.

As shown in FIG. 1, the contact pin 11 is press-fitted into the insertion hole 103 from a base side of the housing 10 (in an arrow direction of in FIG. 1). FIG. 2 is an XZ plane cross-sectional view of a state that press-fitting of the contact pin 11 into the insertion hole 103 of the housing 10 is completed. As shown in FIG. 2, when the press-fitting of the contact pin 11 into the insertion hole 103 of the housing 10 is completed, the pair of protruding portions 117 formed in the horizontally extending portion 111 of the contact pin 11 contact with an inner peripheral surface of the insertion hole 103 of the housing 10. With this structure, the horizontally extending portion 111 of the contact pin 11 is locked in the insertion hole 103 of the housing 10. As a result, when pressure is applied to the contact pin 11 from a front side toward a rear side, it is possible to suppress the contact pin 11 from being removed from the housing 10 to the rear side.

However, locking force provided only by the pair of protruding portions 117 of the horizontally extending portion 111 of the contact pin 11 contacting with the inner peripheral surface of the insertion hole 103 of the housing 10 is not sufficient to prevent the contact pin 11 from being removed from the housing 10. Thus, there is a problem that the contact pin 11 is shifted to the rear side or removed from the housing 10 when strong force is applied to the contact pin 11 from the front side toward the rear side, for example, in a case where the mating connector is not perfectly coaxial with the electrical connector and/or is inserted at an angle with respect to the electrical connector.

Related Art Document

Patent Document

Patent document 1: JP 2022-149019A

SUMMARY OF THE INVENTION

Problem to be Solved by the Invention

The present disclosure has been made in view of the above-mentioned problem. Accordingly, it is an object of the present disclosure to provide an electrical connector which can effectively prevent the contact pin from being shifted in the housing or removed from the housing by increasing locking force of the contact pin in the insertion hole of the housing.

Means for Solving the Problems

The above object is achieved by the present disclosures defined in the following (1).

(1) An electrical connector which can be coupled with a mating connector inserted from a tip side thereof, comprising:

at least one contact pin;

at least one insulating housing for containing the at least one contact pin therein;

at least one metallic outer contact for covering the at least one housing; and a metallic shell for holding the at least one contact pin, the at least one housing and the at least one outer contact, wherein the at least one contact pin includes:

a horizontally extending portion which is located in the at least one housing and linearly extends in an insertion and extraction direction of the mating connector, and at least one protruding portion which extends from a side portion of the horizontally extending portion in the at least one housing in a width direction perpendicular to the insertion and extraction direction of the mating connector, wherein the at least one housing includes:

a cylindrical portion which linearly extends in the insertion and extraction direction of the mating connector and contains the horizontally extending portion of the at least one contact pin therein, and at least one pressing rib formed on an outer peripheral surface of the cylindrical portion at a position corresponding to the at least one protruding portion of the at least one contact pin, wherein the shell includes:

a body portion, and at least one insertion hole which passes through the body portion in the insertion and extraction direction of the mating connector and into which the cylindrical portion of the at least one housing is inserted, and wherein when the cylindrical portion of the at least one housing is inserted into the at least one insertion hole of the shell, the at least one pressing rib of the at least one housing is pressed by an inner surface of the at least one insertion hole of the shell, and thereby a portion of the cylindrical portion of the at least one housing where the at least one pressing rib is formed is elastically deformed toward the inner side and is pressed against the at least one protruding portion of the at least one contact pin to lock the at least one contact pin in the at least one housing.

Effect of the Invention

In the present disclosure, the at least one pressing rib is formed on the outer peripheral surface of the cylindrical portion of the at least one housing at the position corresponding to the at least one protruding portion of the at least one contact pin. With this structure, in a state that the cylindrical portion of the at least one housing is inserted into the at least one insertion hole of the shell and the at least one housing is held by the shell, the at least one pressing rib of the at least one housing is pressed toward the inner side by the inner surface of the at least one insertion hole of the shell. As a result, the portion of the cylindrical portion of the at least one housing where the at least one pressing rib is formed is elastically deformed toward the inner side and is pressed against the at least one protruding portion of the at least one contact pin. Thus, since locking force of the at least one contact pin in the insertion hole of the at least one housing is increased, it is possible to effectively prevent the at least one contact pin from being shifted in the at least one housing or removed from the at least one housing.

DETAILED DESCRIPTION

Figure 1:
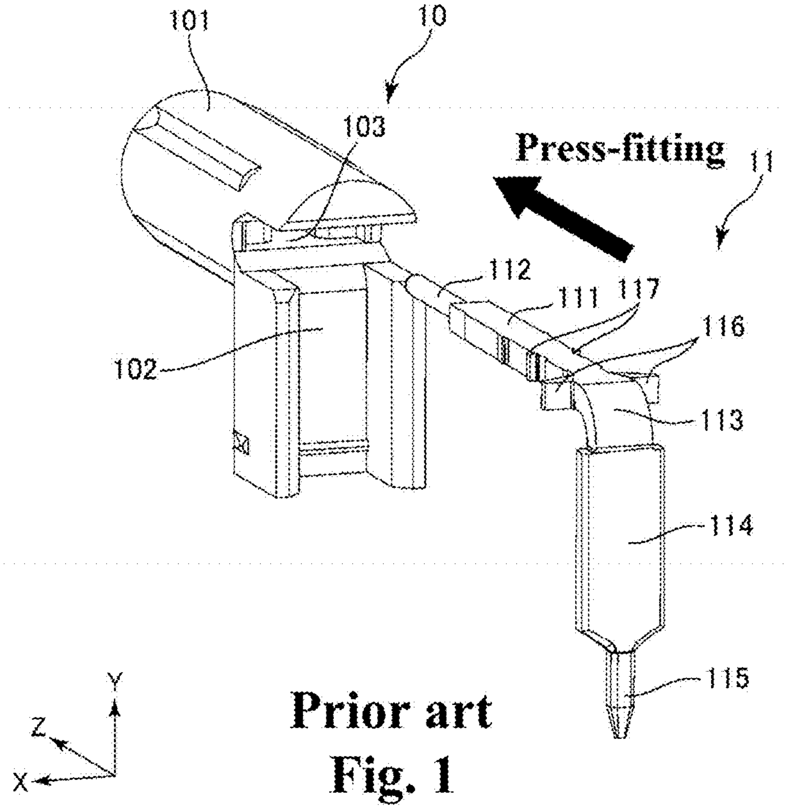
Prior art Fig. 1
FIG. 1 is a perspective view showing a housing and a contact pin typically used in a conventional electrical connector.
Figure 2:
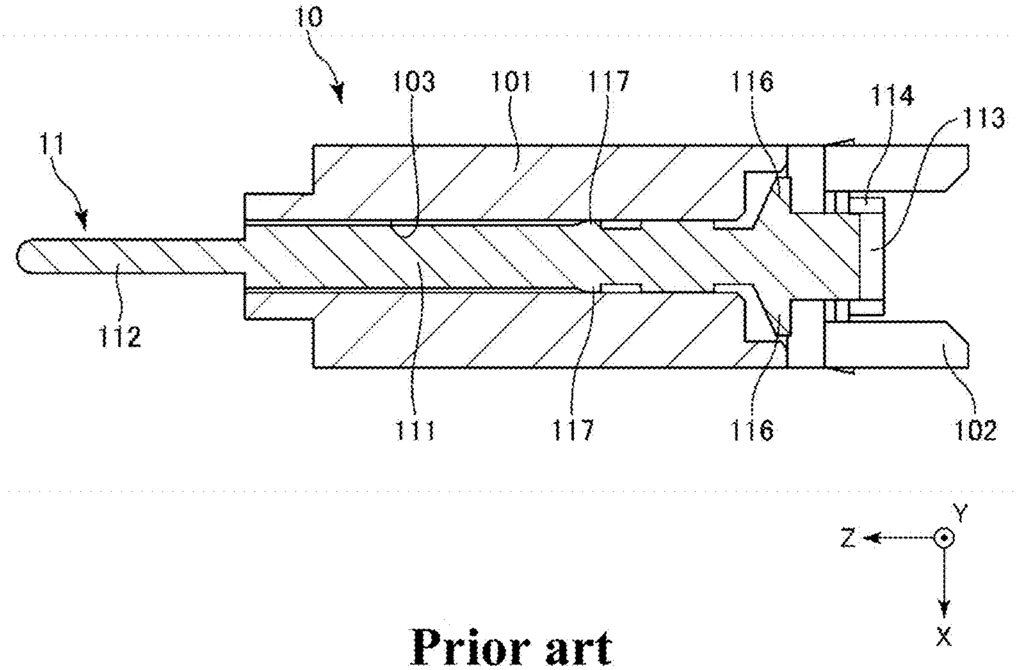
Prior art Fig. 2
FIG. 2 is an XZ plane cross-sectional view showing a state that the contact pin is contained in an insertion hole of the housing shown in FIG. 1.

Hereinafter, an electrical connector of the present disclosure will be described with reference to a preferred embodiment shown in the accompanying drawings. Note that each of the figures referred in the following description is a schematic diagram prepared for explaining the present disclosure. A dimension (such as a length, a width and a thickness) of each component shown in the drawings is not necessarily identical to an actual dimension. Further, the same reference numbers are used throughout the drawings to refer to the same or similar elements. In the following description, the positive direction of the Z-axis in each figure may be referred to as "a tip side" or "a front side", the negative direction of the Z-axis in each figure may be referred to as "a base side" or "a rear side", the positive direction of the Y-axis in each figure may be referred to as "an upper side", the negative direction of the Y-axis in each figure may be referred to as "a lower side", the positive direction of the X-axis in each figure may be referred to as "a near side" and the negative direction of the X-axis in each figure may be referred to as "a far side". Further, the Z direction may be referred to as "an insertion and extraction direction of a mating connector", the Y direction may be referred to as "a height direction" and the X direction may be referred to as "a width direction".

Figure 3:
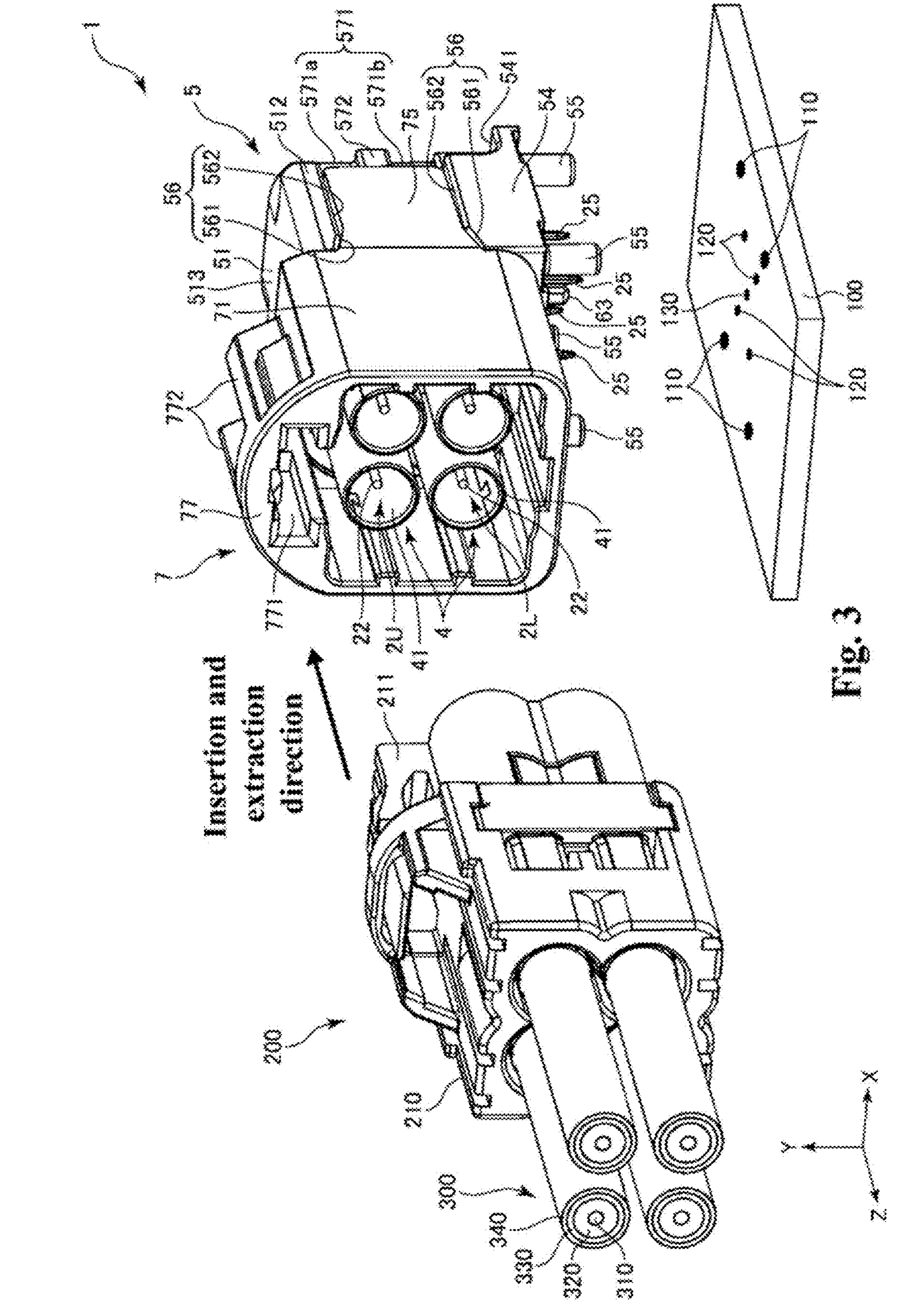
FIG. 3 is a perspective view showing an electrical connector of the present disclosure, a circuit board on which the electrical connector of the present disclosure is mounted and a mating connector which should be connected with the electrical connector of the present disclosure.
Figure 4:
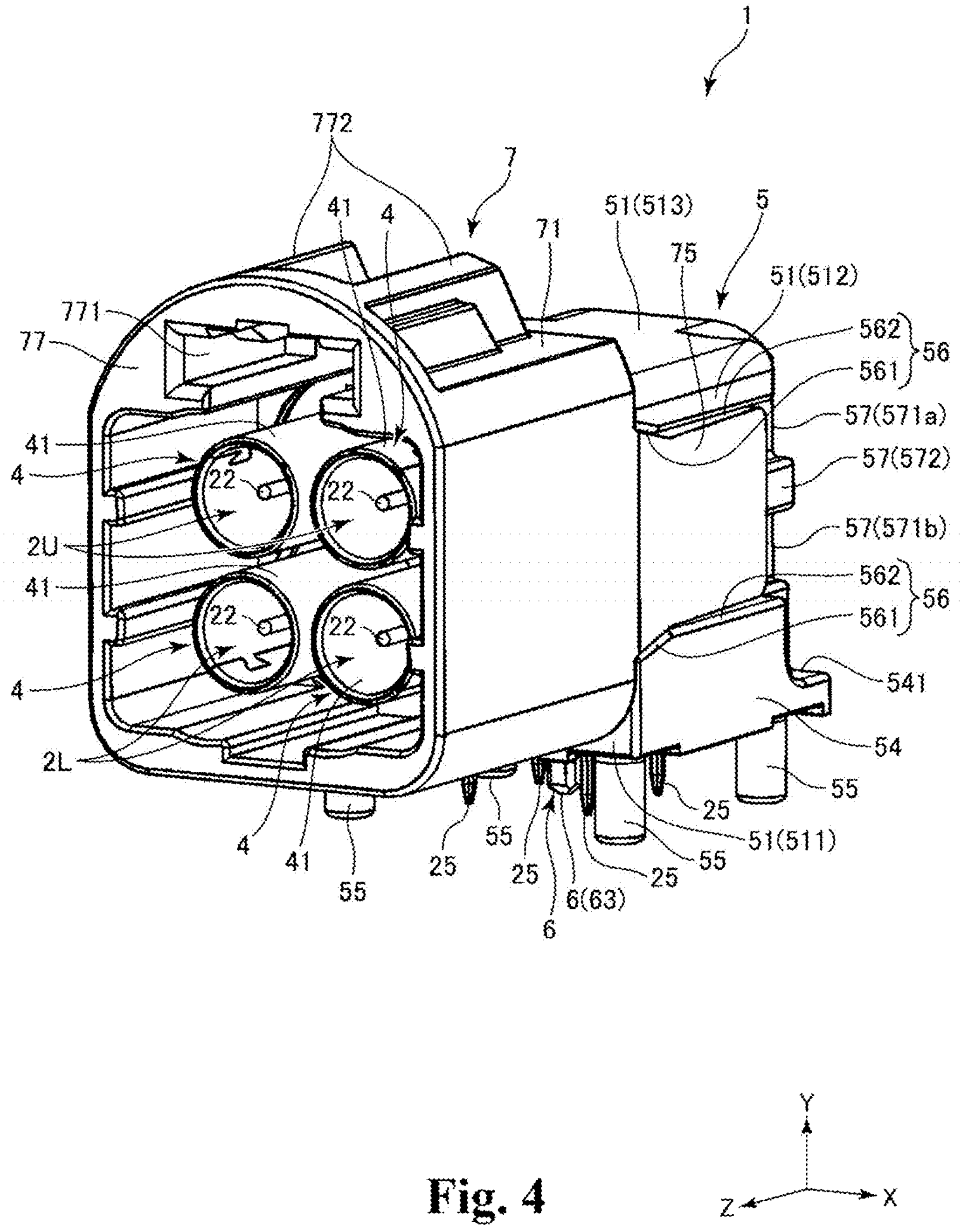
FIG. 4 is a perspective view of the electrical connector shown in FIG. 3.
Figure 5:
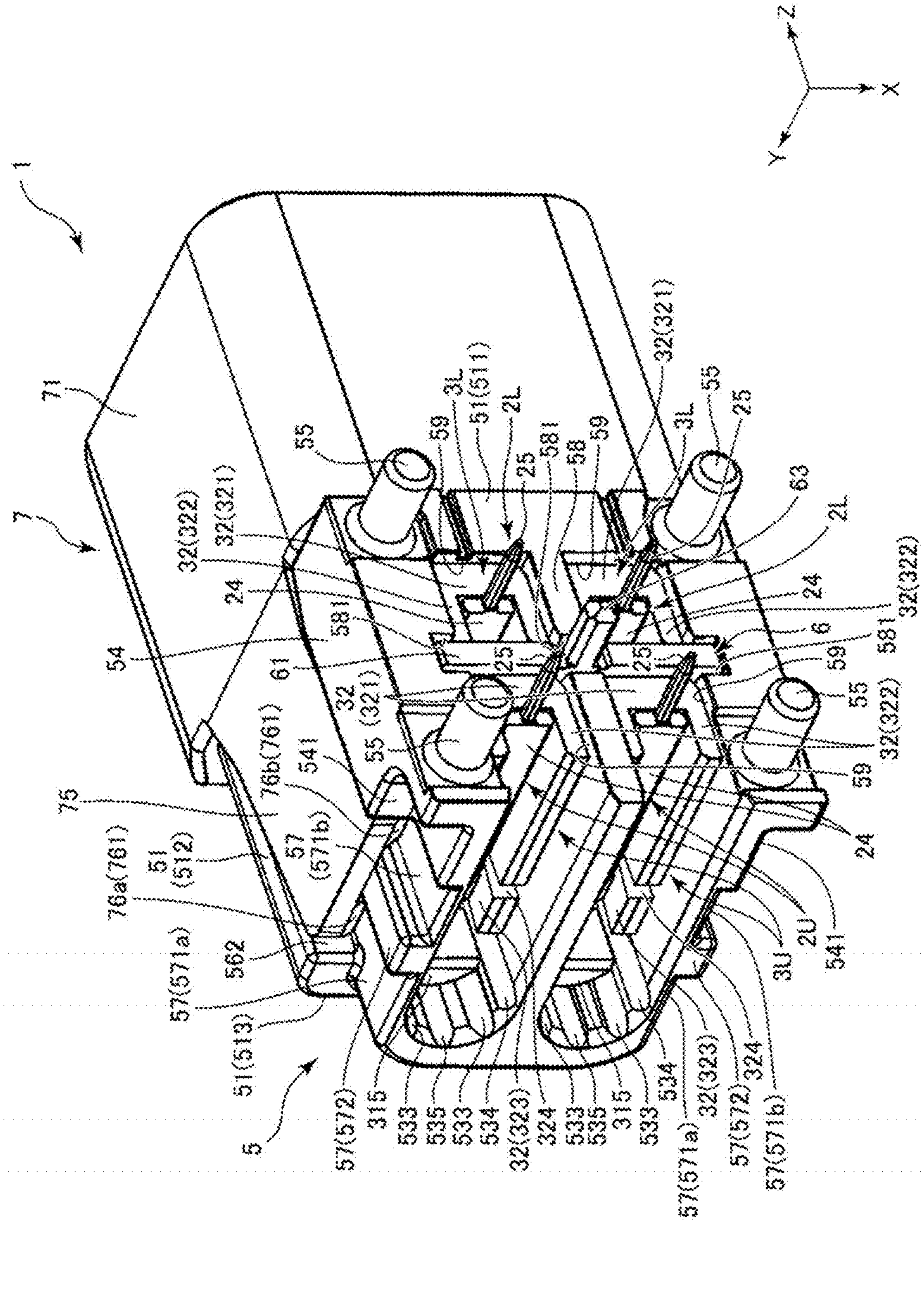
FIG. 5 is another perspective view of the electrical connector shown in FIG. 3 viewed from another angle.
Figure 6:
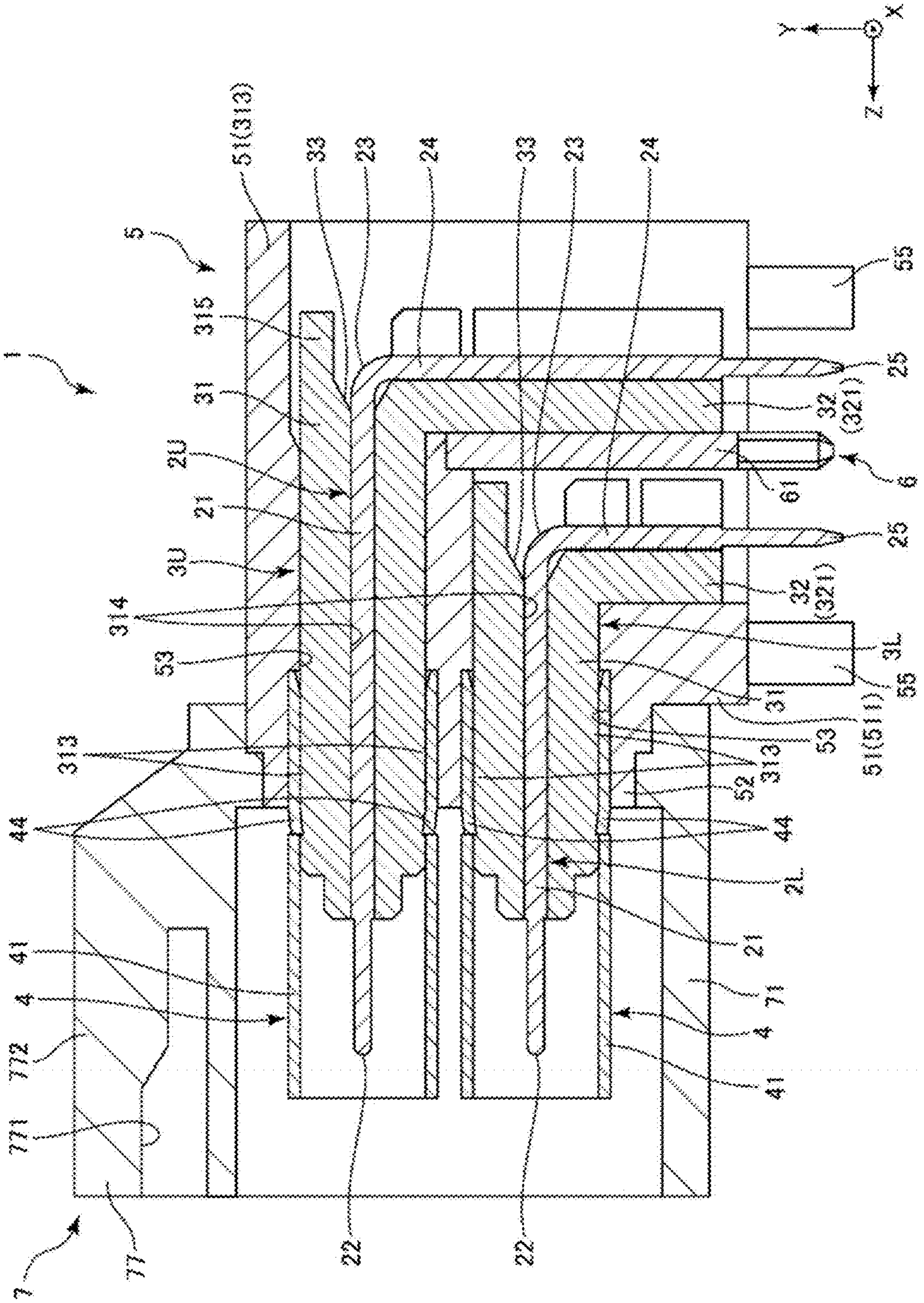
FIG. 6 is a YZ cross-sectional view containing an upper housing and a lower housing respectively holding a lower contact pin and an upper contact pin of the electrical connector shown in FIG. 3.
Figure 7:
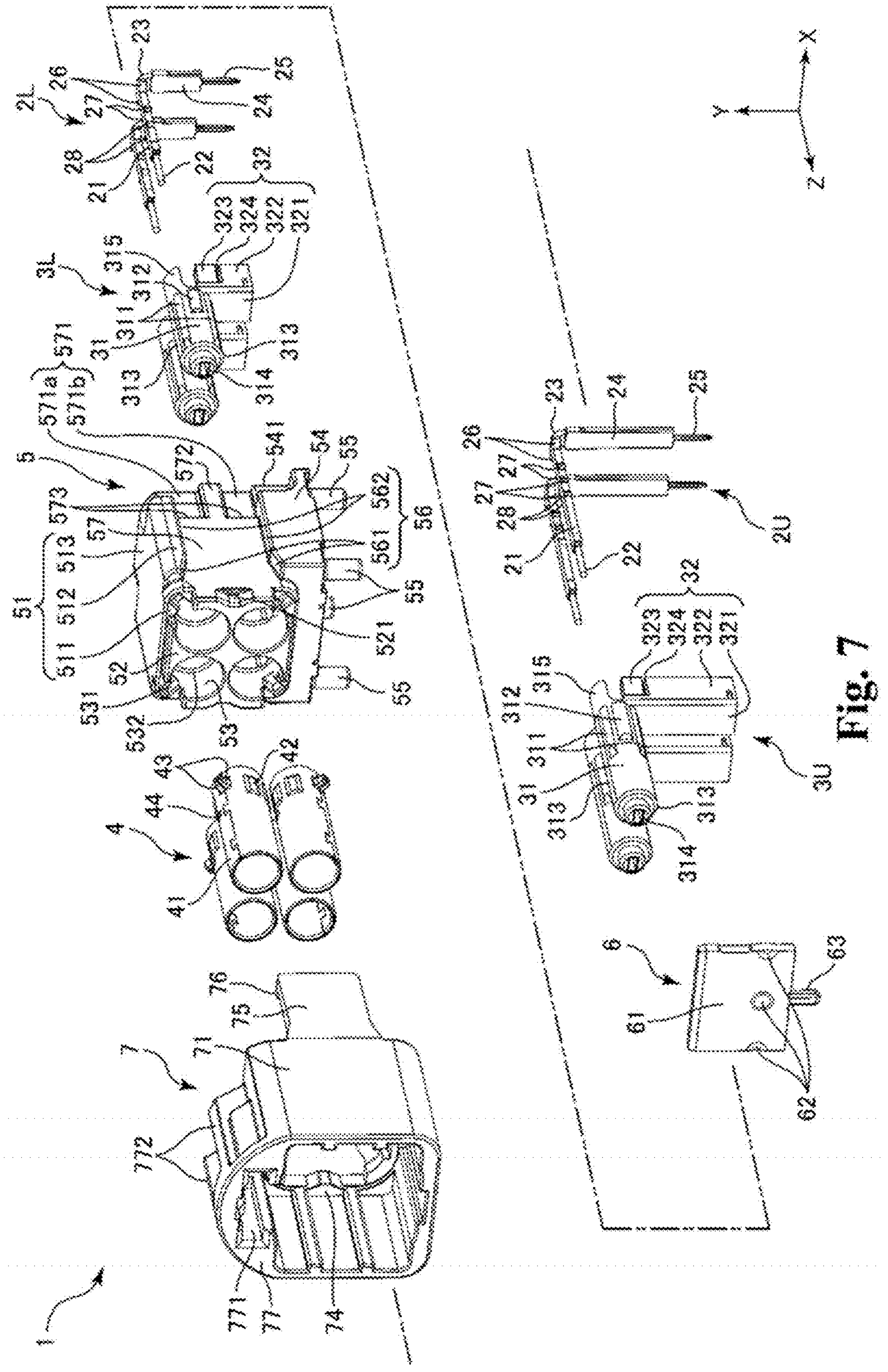
FIG. 7 is an exploded perspective view of the electrical connector shown in FIG. 3.
Figure 8:
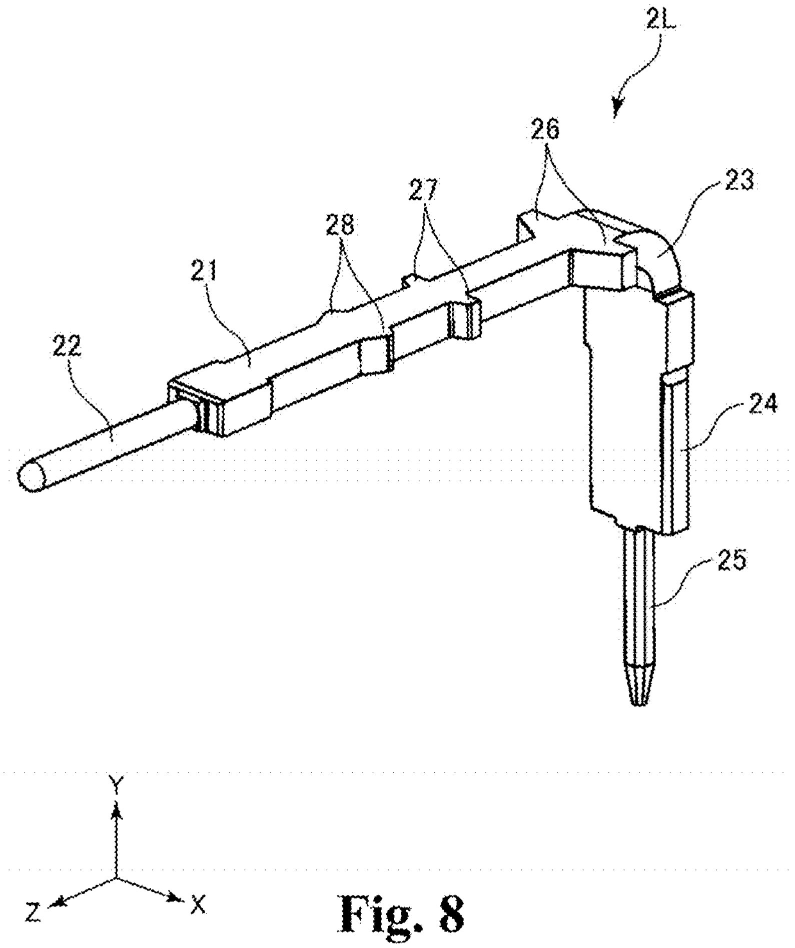
FIG. 8 is a perspective view of the lower contact pin.
Figure 9:
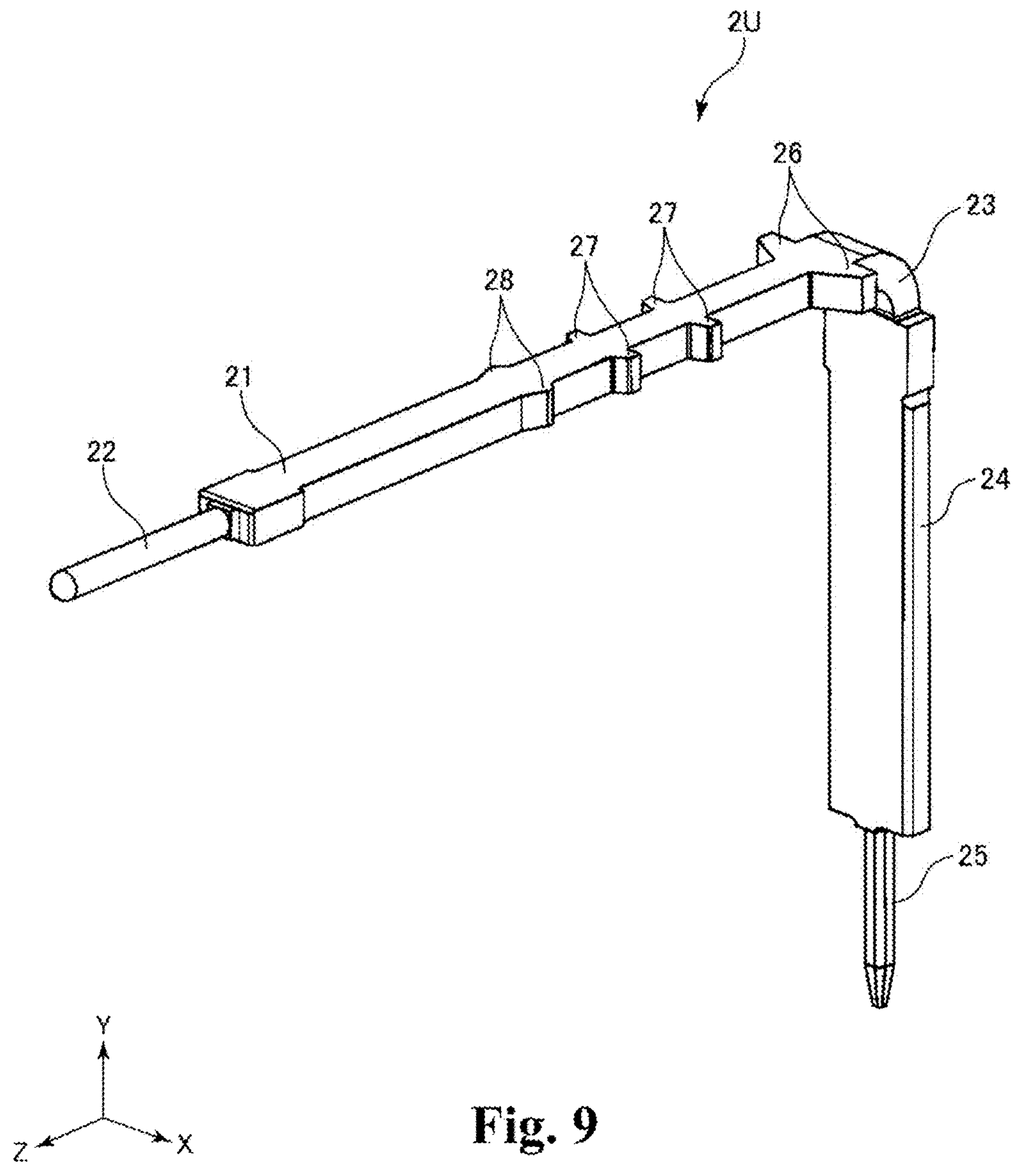
FIG. 9 is a perspective view of the upper contact pin.
Figure 10:
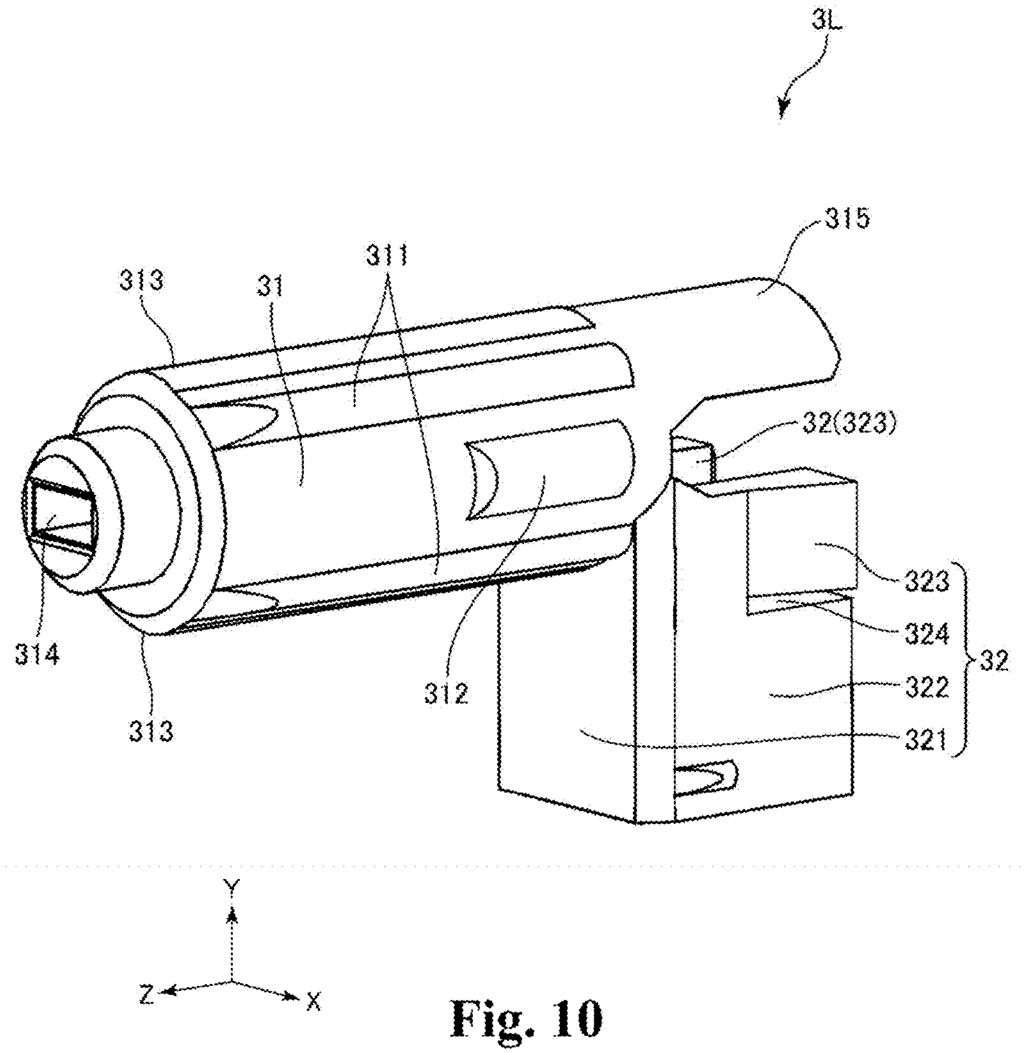
FIG. 10 is a perspective view of the lower housing.
Figure 11:
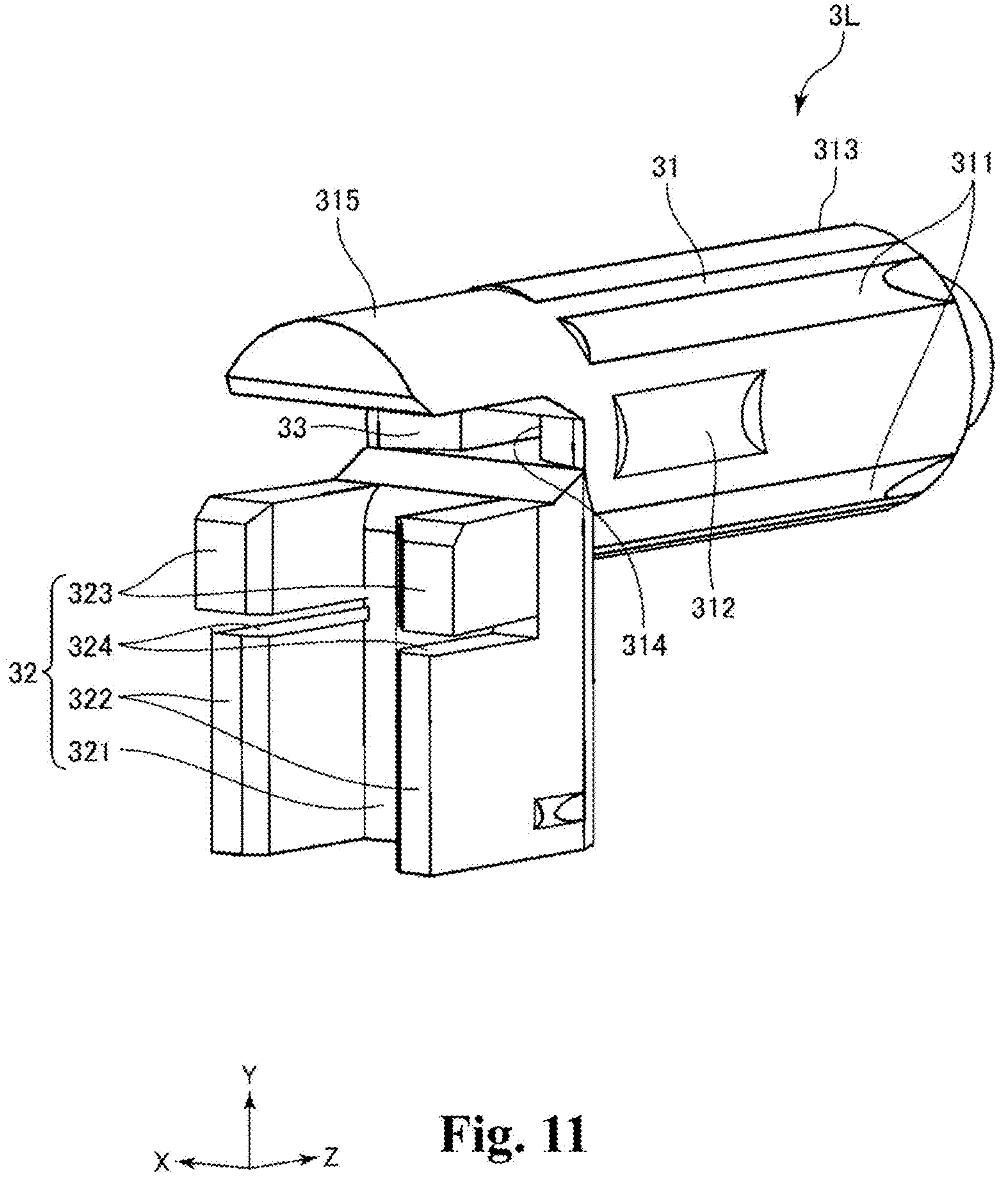
FIG. 11 is a perspective view of the lower housing viewed from another angle.
Figure 12:
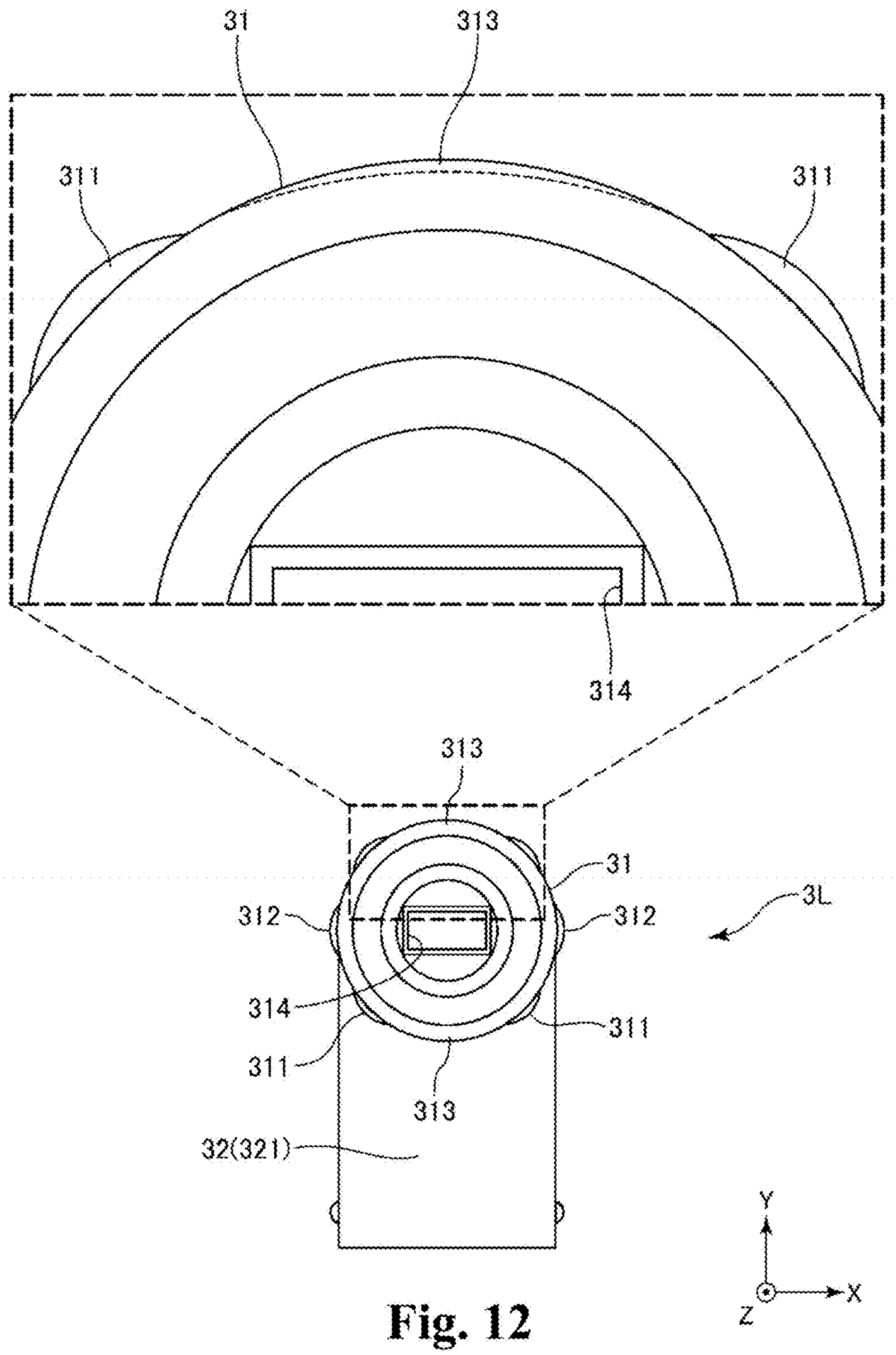
FIG. 12 is a front view of the lower housing with a partially enlarged view of a vicinity of an upper portion thereof.
Figure 13:
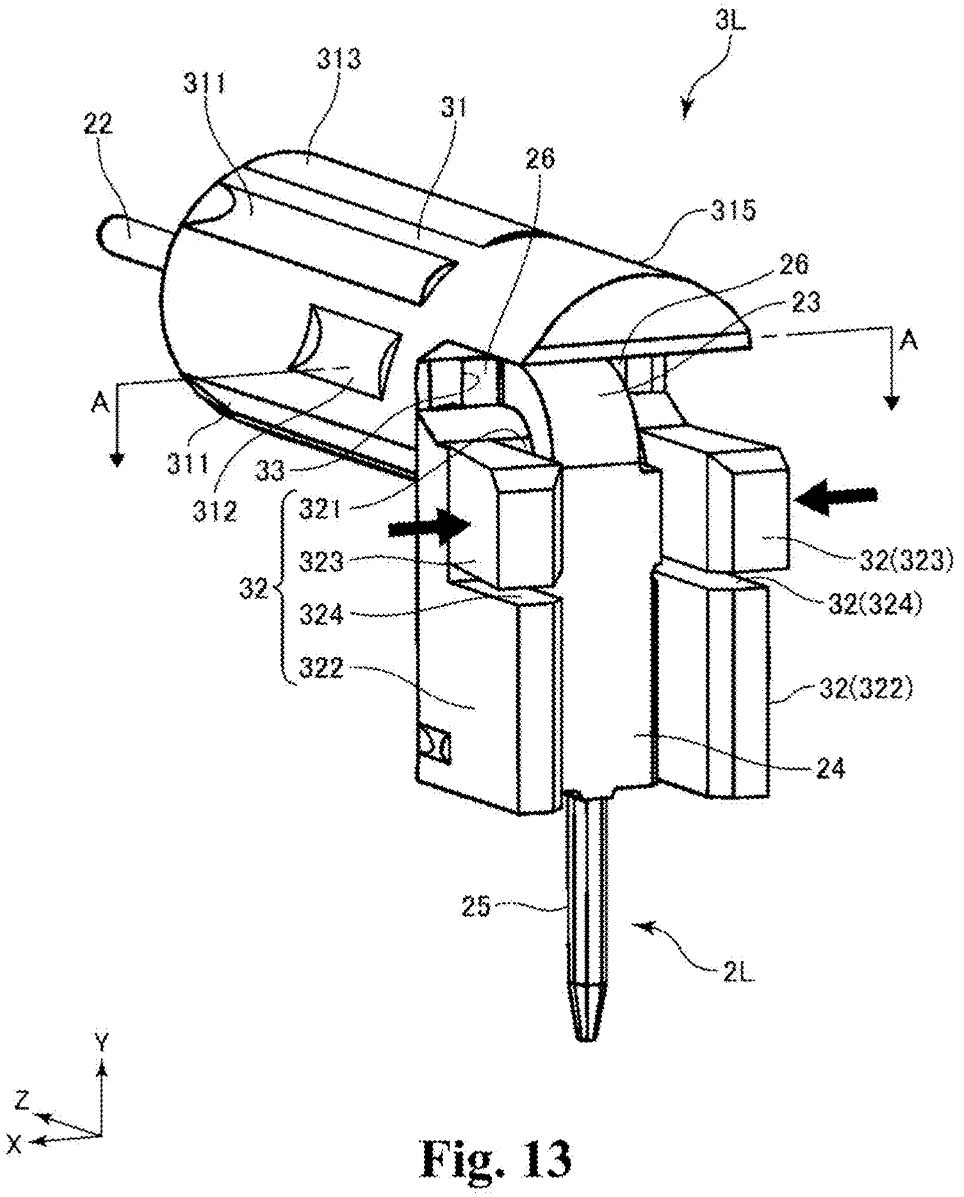
FIG. 13 is a perspective view showing the lower housing and the lower contact pin after the lower contact pin has been press-fitted into the lower housing.
Figure 14:
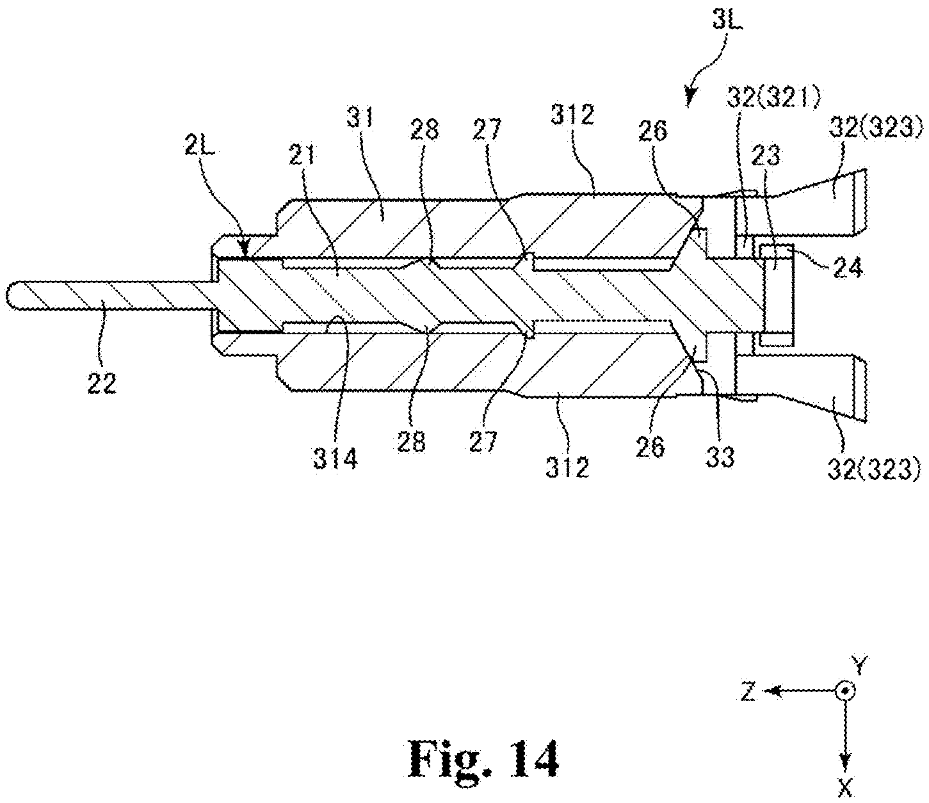
FIG. 14 is an XZ plane cross-sectional view along an A-A line shown in FIG. 13.
Figure 15:
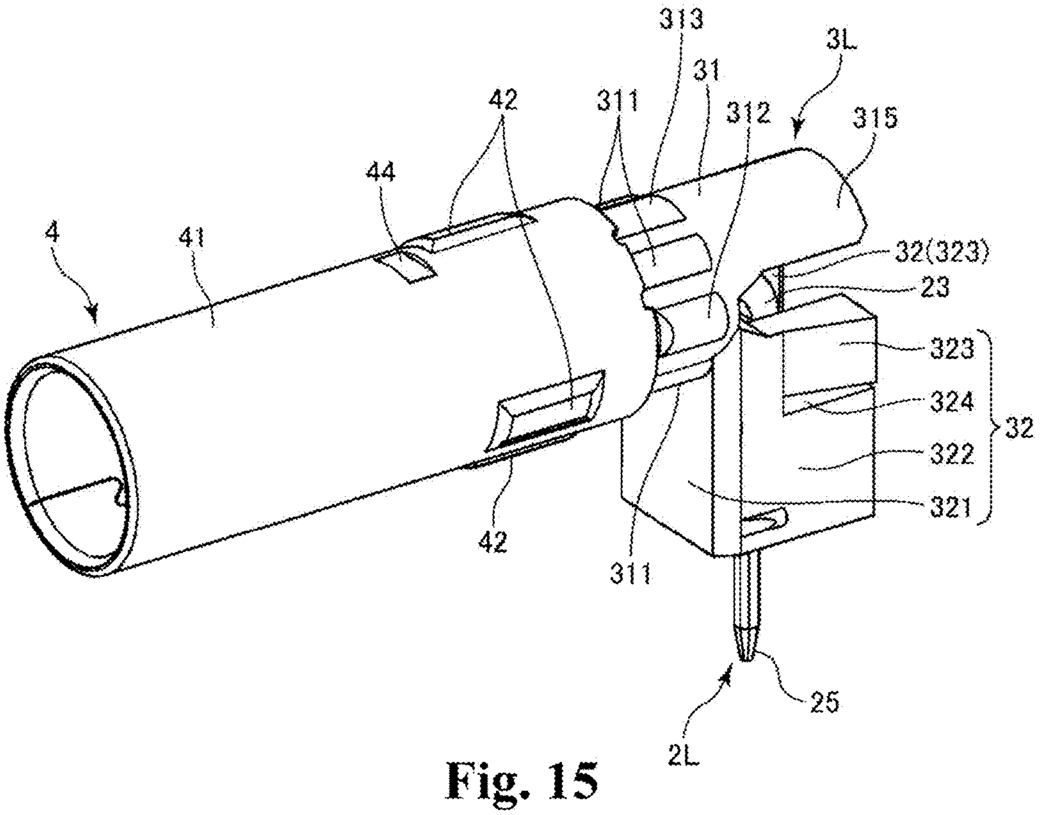
FIG. 15 is a perspective view showing a state that the lower housing containing the lower contact pin is press-fitted into an outer contact.
Figure 16:
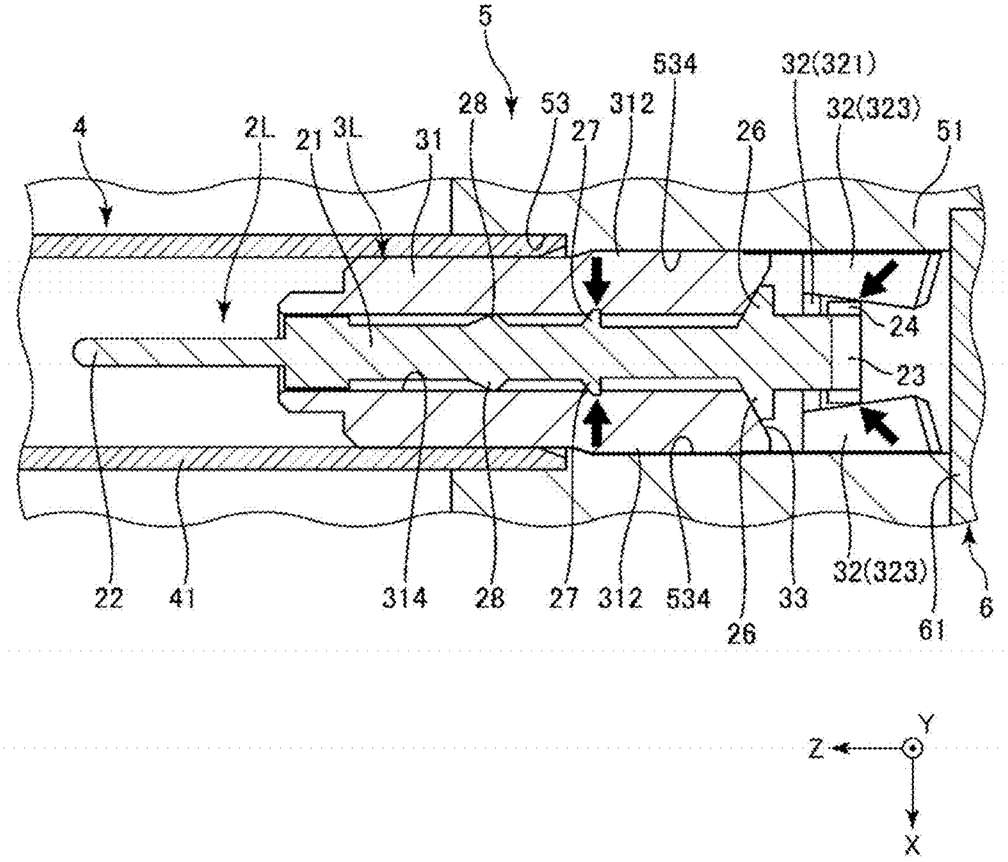
FIG. 16 is a partially enlarged view of an XZ cross-sectional view in a state that the lower housing has been press-fitted into a shell.
Figure 17:
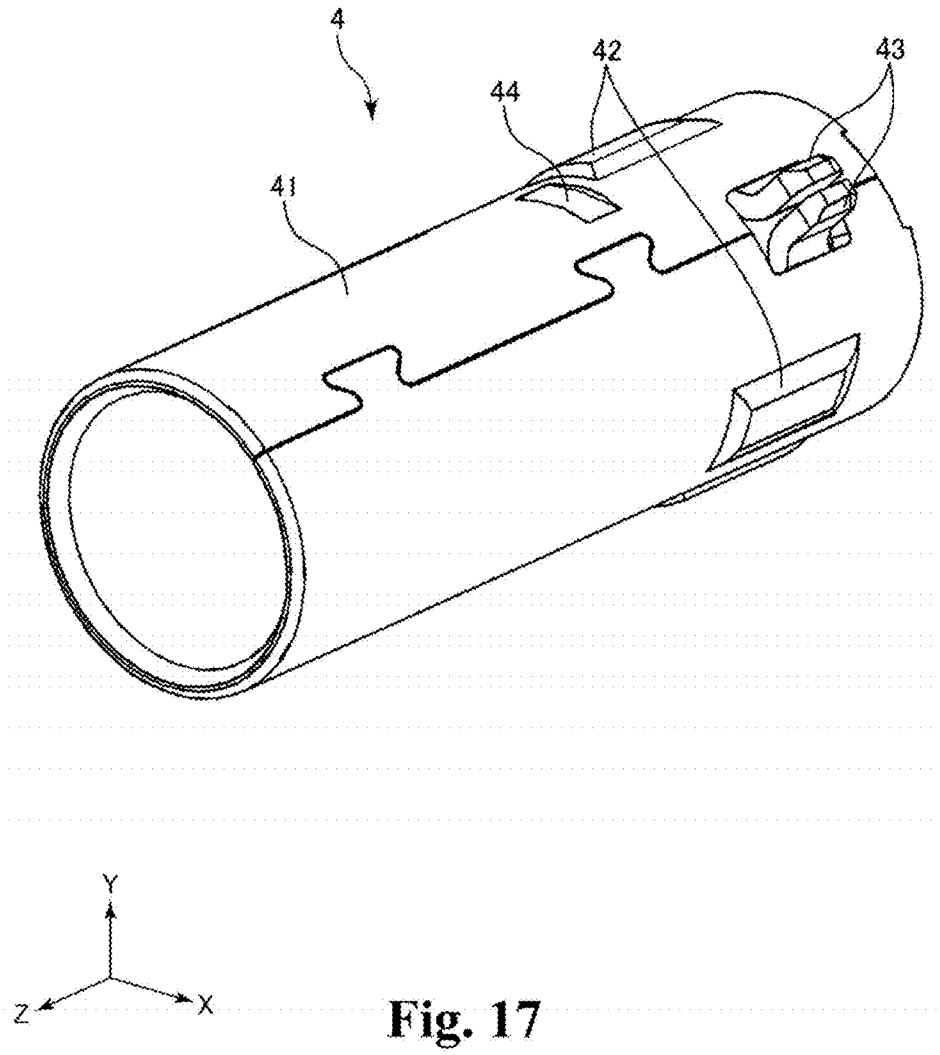
FIG. 17 is a perspective view of the outer contact.
Figure 18:
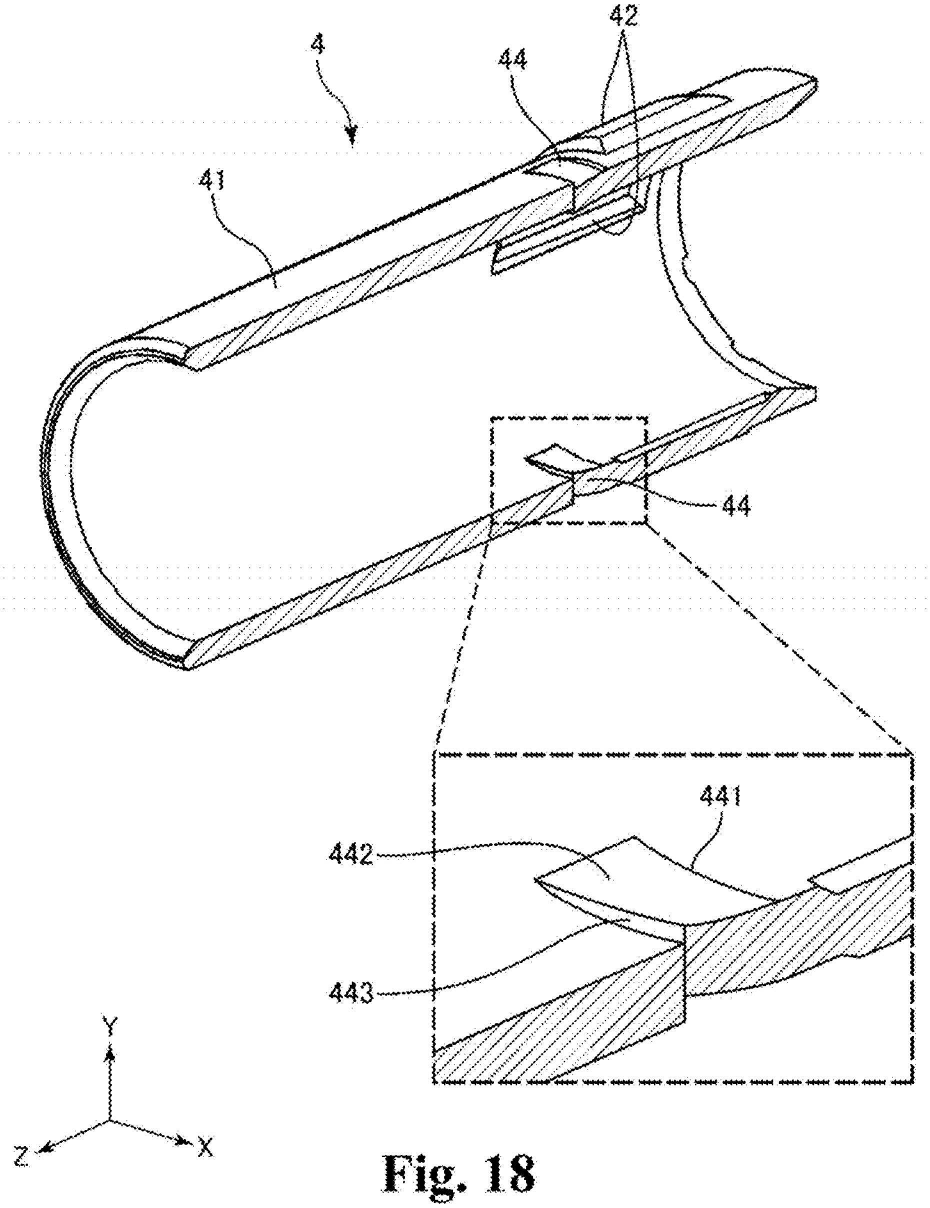
FIG. 18 is an enlarged view of a cross-sectional perspective view of a locking protrusion formed on an inner peripheral surface of the outer contact.
Figure 19:
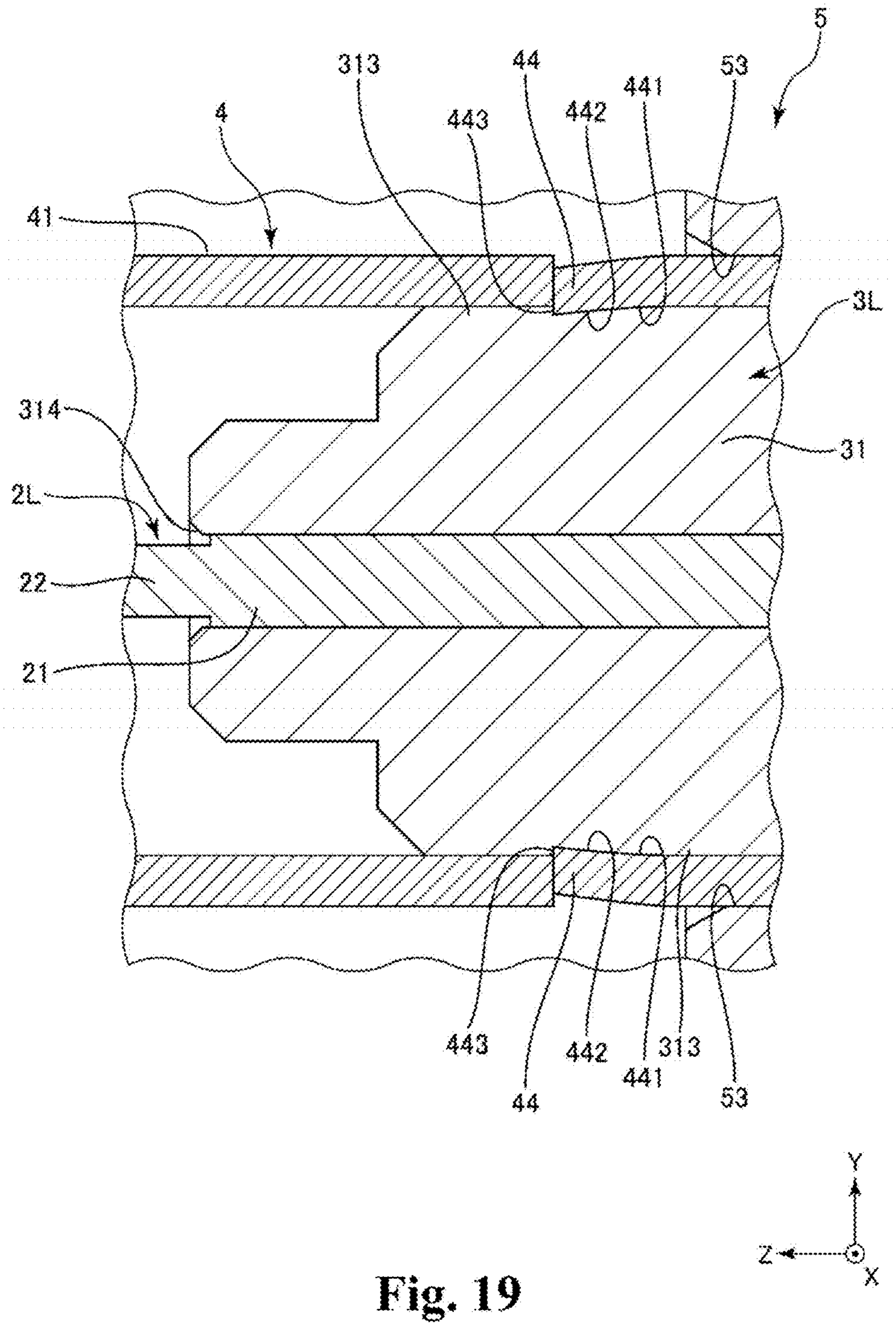
FIG. 19 is a partially enlarged view of a cross-sectional view showing a relationship between the locking protrusion of the outer contact and a locking rib of the housing.
Figure 20:
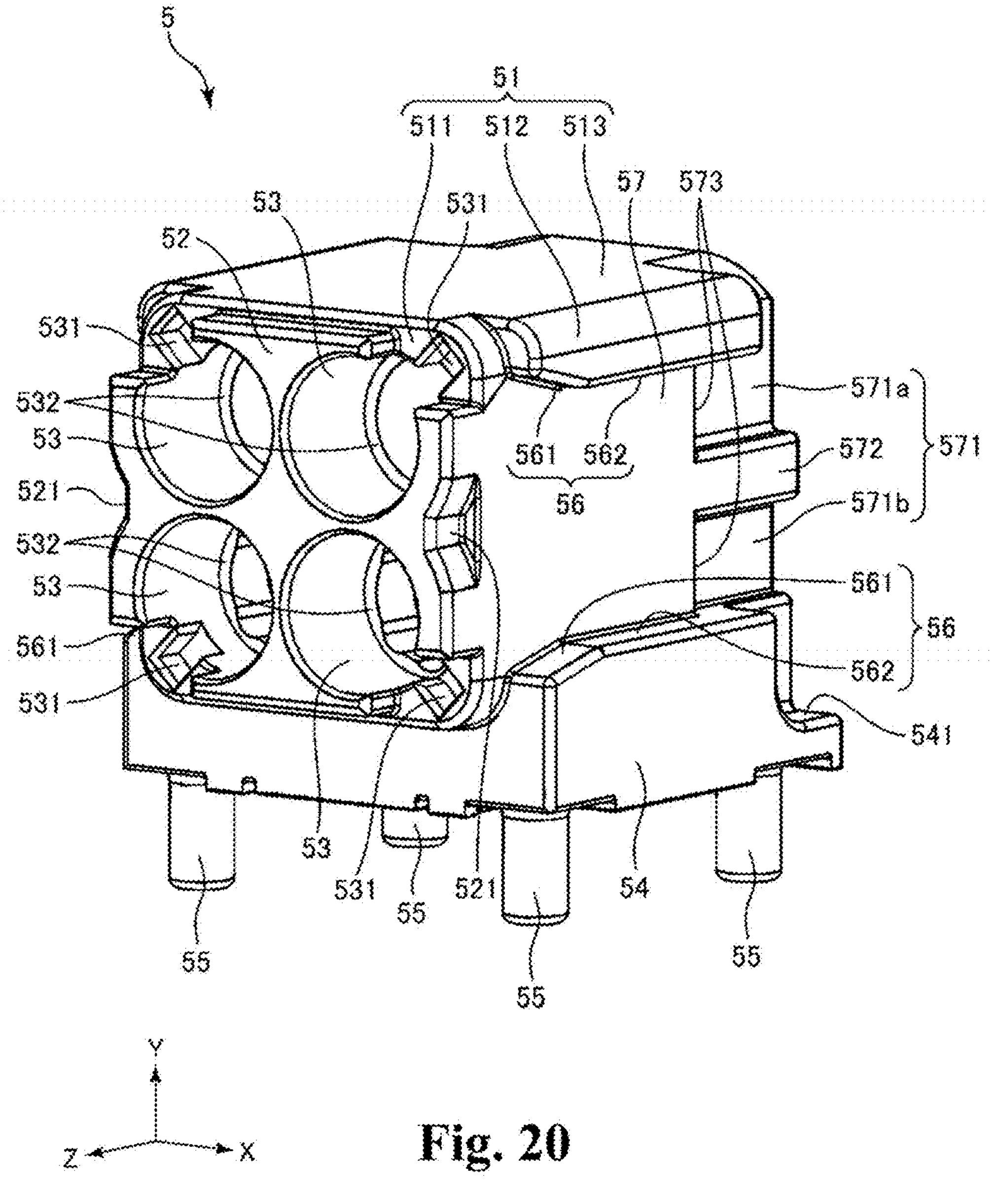
FIG. 20 is a perspective view of the shell.
Figure 21:
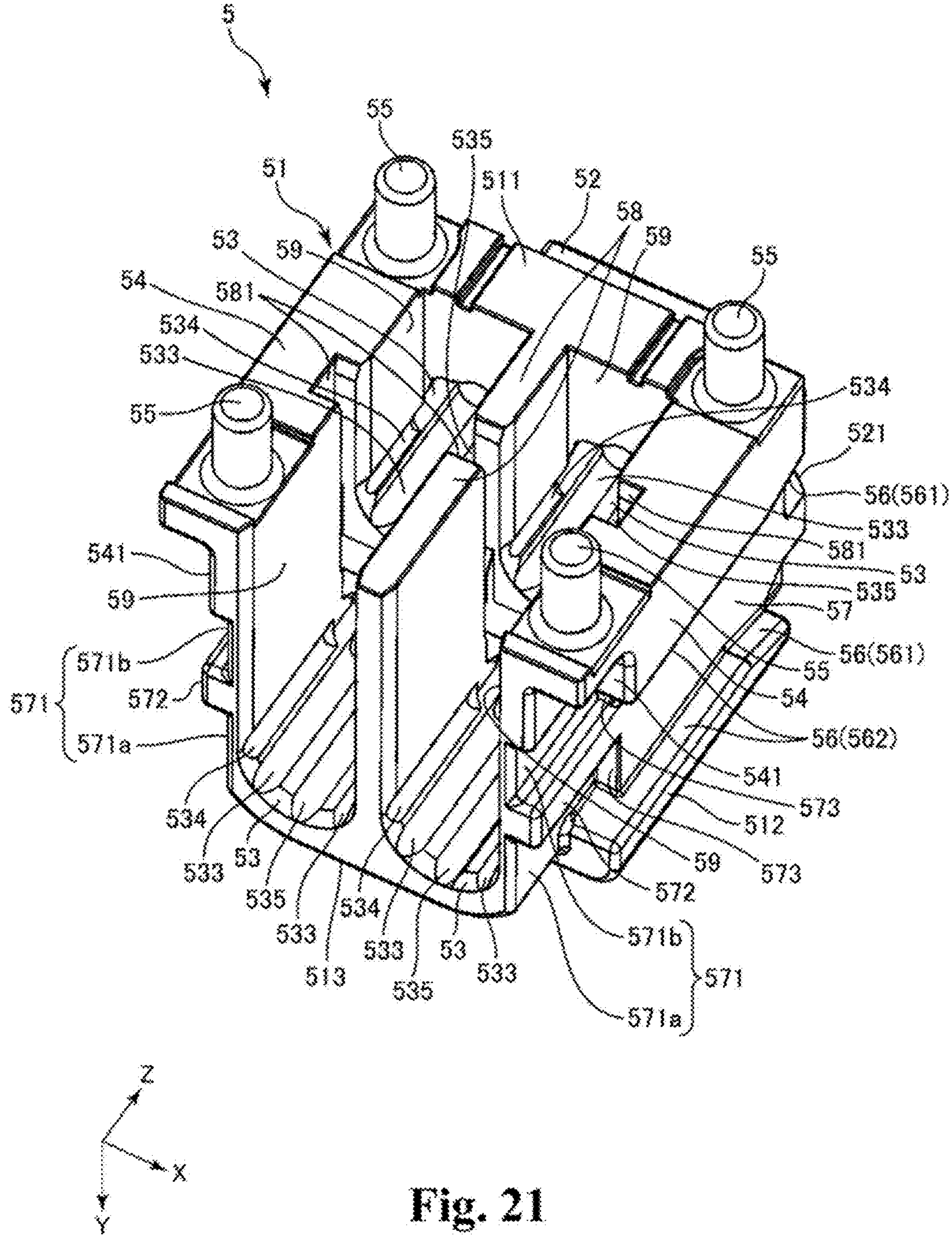
FIG. 21 is a perspective view of the shell viewed from another angle.
Figure 22:
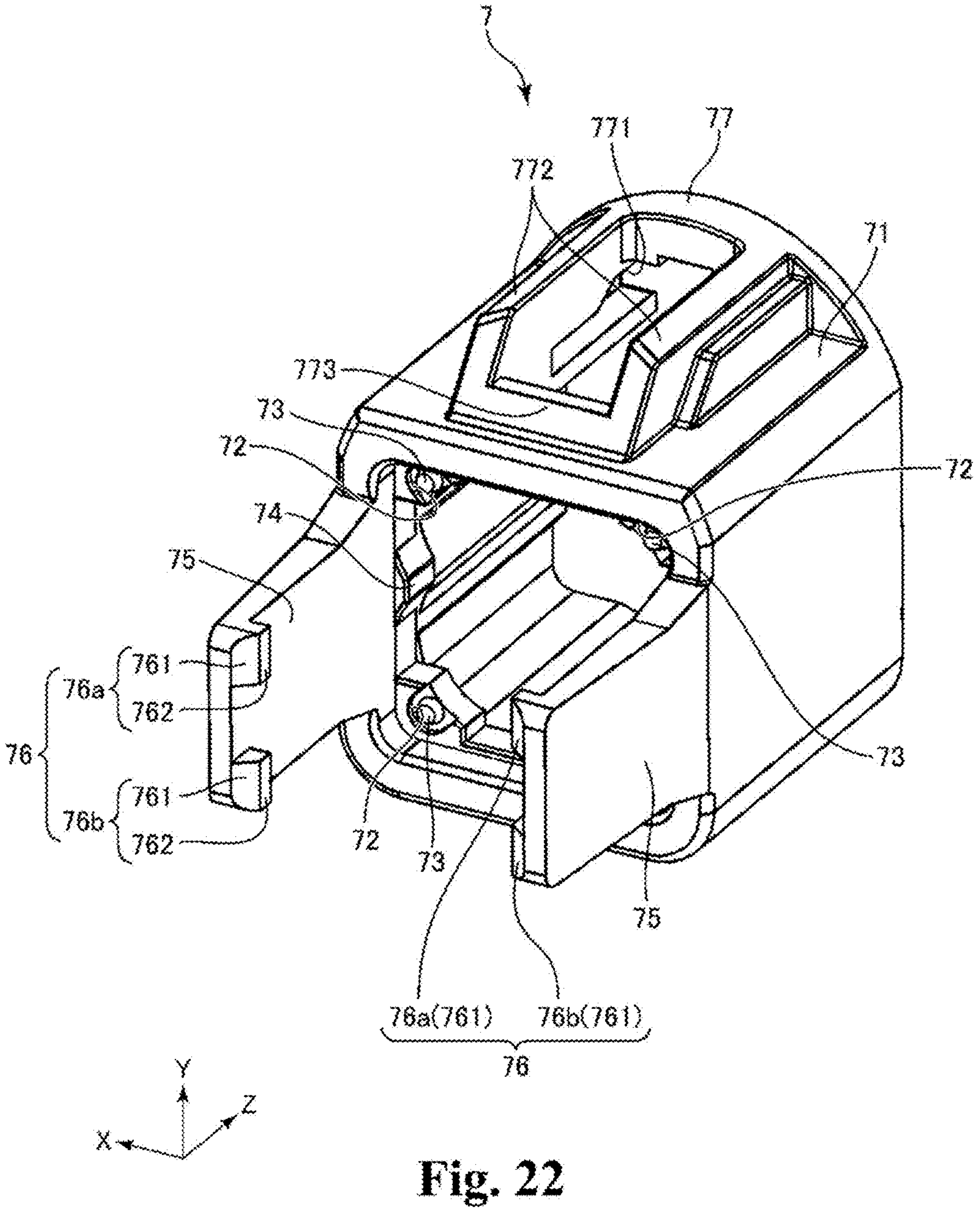
FIG. 22 is a perspective view of a cover.
Figure 23:
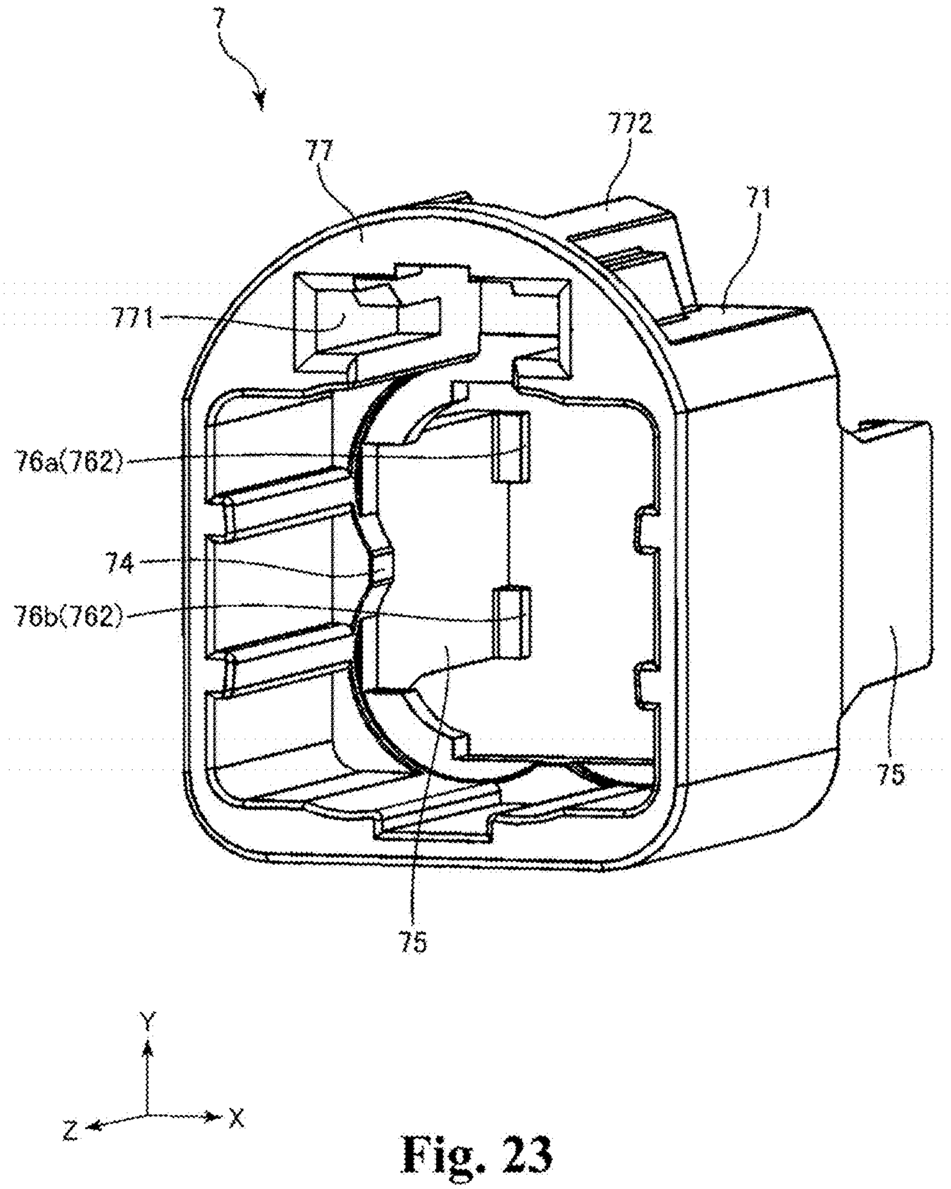
FIG. 23 is a perspective view of the cover viewed from another angle.
Figure 24:
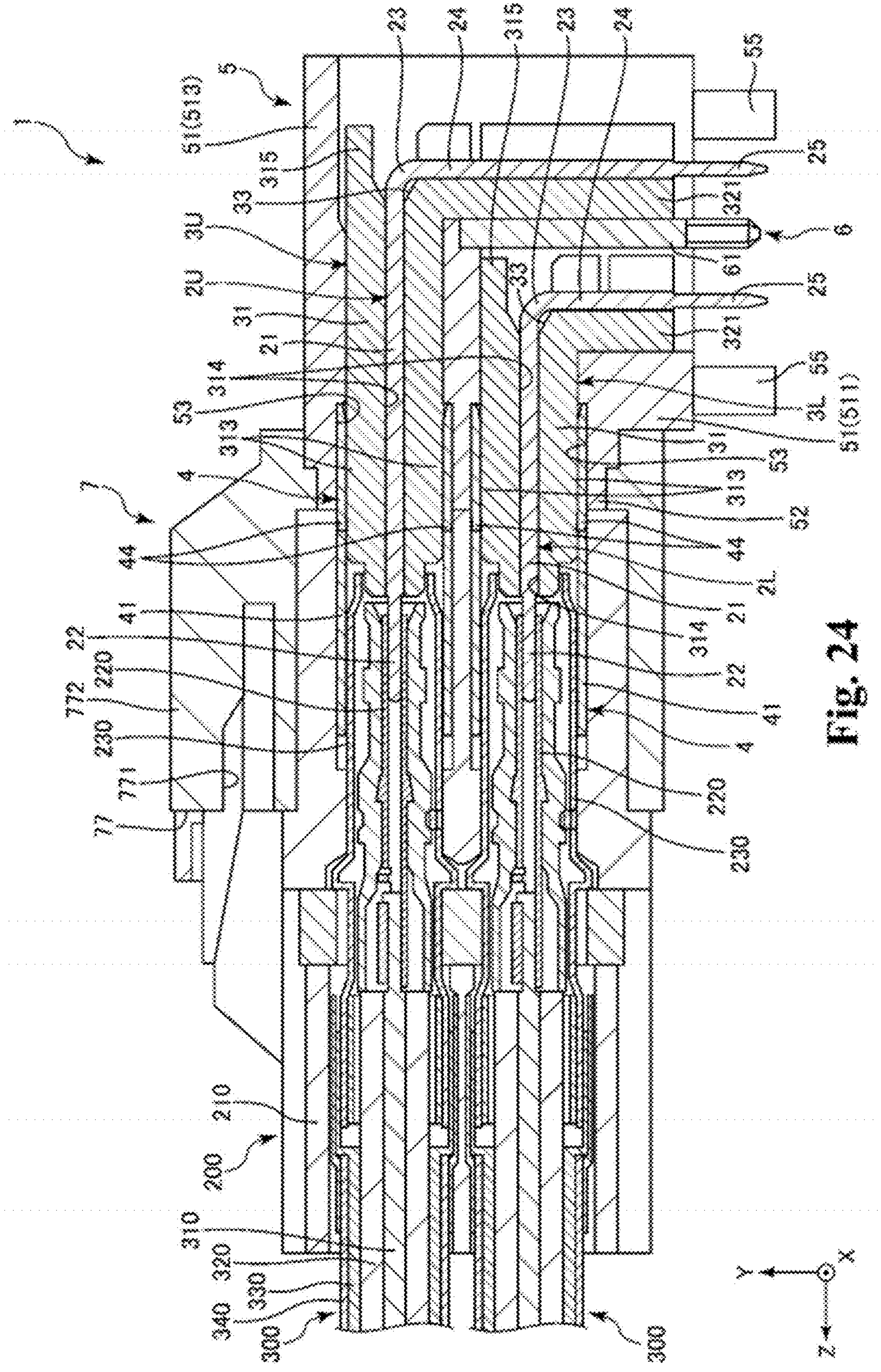
FIG. 24 is a YZ plane cross-sectional view containing the lower contact pin and the upper contact pin in a state that the electrical connector and the mating connector are coupled with each other.

FIG. 3 is a perspective view showing an electrical connector of the present disclosure, a circuit board on which the electrical connector of the present disclosure is mounted and a mating connector which should be connected with the electrical connector of the present disclosure. FIG. 4 is a perspective view of the electrical connector shown in FIG. 3. FIG. 5 is another perspective view of the electrical connector shown in FIG. 3 viewed from another angle. FIG. 6 is a YZ cross-sectional view containing an upper housing and a lower housing respectively holding a lower contact pin and an upper contact pin of the electrical connector shown in FIG. 3. FIG. 7 is an exploded perspective view of the electrical connector shown in FIG. 3. FIG. 8 is a perspective view of the lower contact pin. FIG. 9 is a perspective view of the upper contact pin. FIG. 10 is a perspective view of the lower housing. FIG. 11 is a perspective view of the lower housing viewed from another angle. FIG. 12 is a front view of the lower housing with a partially enlarged view of a vicinity of an upper portion thereof. FIG. 13 is a perspective view showing the lower housing and the lower contact pin after the lower contact pin has been press-fitted into the lower housing. FIG. 14 is an XZ plane cross-sectional view along an A-A line shown in FIG. 13. FIG. 15 is a perspective view showing a state that the lower housing containing the lower contact pin is press-fitted into an outer contact. FIG. 16 is a partially enlarged view of an XZ cross-sectional view in a state that the lower housing has been press-fitted into a shell. FIG. 17 a perspective view of the outer contact. FIG. 18 is an enlarged view of a cross-sectional perspective view of a locking protrusion formed on an inner peripheral surface of the outer contact. FIG. 19 is a partially enlarged view of a cross-sectional view showing a relationship between the locking protrusion of the outer contact and a locking rib of the housing. FIG. 20 is a perspective view of the shell. FIG. 21 is a perspective view of the shell viewed from another angle. FIG. 22 is a perspective view of a cover. FIG. 23 is a perspective view of the cover viewed from another angle. FIG. 24 is a YZ plane cross-sectional view containing the lower contact pin and the upper contact pin in a state that the electrical connector and the mating connector are coupled with each other.

As shown in FIG. 3, an electrical connector 1 of the present disclosure is a receptacle connector which should be mounted on a circuit board 100 provided in an arbitrary device. When a mating connector (a plug connector) 200 attached to a tip end portion of four coaxial cables 300 is inserted into the electrical connector 1 from the tip side to couple the electrical connector 1 with the mating connector 200, the four coaxial cables 300 and the circuit board 100 are electrically connected to each other through the electrical connector 1 and the mating connector 200.

Each of the coaxial cables 300 has a coaxial structure in which a core wire (a center conductor) 310, an inner insulator layer 320 covering the core wire 310, an outer conductor layer (a braid layer) 330 covering the inner insulator layer 320 and an outer insulator layer 340 covering the outer conductor layer 330 are concentrically arranged. Although this matter is omitted in FIG. 3, other end portions of the coaxial cables 300 are connected to another device differing from the device including the circuit board 100. Thus, when the electrical connector 1 and the mating connector 200 are coupled with each other, it becomes possible to perform a signal communication between the device including the circuit board 100 and the other device through the coaxial cables 300. The device including the circuit board 100 is typically an ECU (Electronic Control Unit) for controlling operations of a vehicle. The other device to which the other end portions of the coaxial cables 300 are connected is typically an in-vehicle device such as a car navigation, a car audio, an in-vehicle camera, an in-vehicle GPS, an in-vehicle TV and an in-vehicle radio. By coupling the electrical connector 1 and the mating connector 200 with each other, it becomes possible to perform a high-speed signal communication between the in-vehicle device and the ECU through the four coaxial cables 300. The electrical connector 1 May be a 1-pin connector for providing a coaxial connection with one coaxial cable 300 or may be a multi-pin connector for providing coaxial connections with a plurality of coaxial cables 300. Hereinafter, the electrical connector 1 will be described with assuming that the electrical connector 1 is a 4-pin connector for providing coaxial connections with the four coaxial cables 300.

As shown in FIGS. 4-7, in particular FIG. 7, the electrical connector 1 includes two lower contact pins 2L and two upper contact pins 2U which should be respectively contacted with corresponding contact pins 220 (see FIG. 24) of the mating connector 200, two lower housings 3L for respectively holding the two lower contact pins 2L, two upper housings 3U for respectively holding the two upper contact pins 2U, four cylindrical outer contacts 4 for respectively covering the two lower housings 3L and the two upper housings 3U, a metallic shell 5 for holding the lower housings 3L, the upper housings 3U and the outer contacts 4, a shield member 6 inserted into the shell 5 for preventing electromagnetic interference between the two lower contact pins 2L and the two upper contact pins 2U and a cover 7 attached to a tip end portion of the shell 5.

Each of the lower contact pins 2L and the upper contact pins 2U is an L-shaped member made of a conductive material such as a copper alloy. Each of the lower contact pins 2L and the upper contact pins 2U contacts with the corresponding contact pin 220 of the mating connector 200 to provide an electrical connection between the mating connector 200 and the electrical connector 1 when the electrical connector 1 and the mating connector 200 are coupled with each other. As shown in FIGS. 8 and 9, each of the lower contact pins 2L and the upper contact pins 2U includes a horizontally extending portion 21 linearly extending in the insertion and extraction direction of the mating connector 200 (the Z direction), a contact portion 22 linearly extending from a tip end portion of the horizontally extending portion 21 toward the tip side, a connection portion 23 curved from a base end portion of the horizontally extending portion 21 so as to extend toward the lower side, a downwardly extending portion 24 extending from a lower end portion of the connection portion 23 toward the lower side, a terminal portion 25 protruding from a lower end portion of the downwardly extending portion 24 toward the lower side, a pair of press-fitting shoulders 26 respectively extending from both side portions (both side surfaces in the X direction) of the base end portion of the horizontally extending portion 21 in the width direction of the lower contact pin 2L or the upper contact pin 2U (the X direction and the outer side) perpendicular to the insertion and extraction direction of the mating connector 200 (the Z direction), at least a pair of first protruding portions 27 respectively protruding in the width direction of the lower contact pin 2L or the upper contact pin 2U from both side portions of a portion located closer to the tip side than a portion of the horizontally extending portion 21 where the pair of press-fitting shoulders 26 are formed and a pair of second protruding portions 28 respectively protruding in the width direction of the lower contact pin 2L or the upper contact pin 2U from both side portions of a portion located closer to the tip side than a portion where at least the pair of first protruding portions 27 of the horizontally extending portion 21 are formed.

As shown in FIG. 8, the lower contact pin 2L includes a pair of first protruding portions 27. On the other hand, as shown in FIG. 9, the upper contact pin 2U includes two pairs of first protruding portions 27. In this regard, since the lower contact pin 2L has the same configuration as the configuration of the upper contact pin 2U except that lengths of the horizontally extending portion 21 and the downwardly extending portion 24 and the number of the pairs of first protruding portions 27 are different, the configuration of the lower contact pin 2L will be described with reference to FIG. 8 in the following description as a representative.

The horizontally extending portion 21 is a plate-like portion linearly extending in the insertion and extraction direction of the mating connector 200 (the Z direction). When the lower contact pin 2L is press-fitted into an insertion hole 314 (see FIG. 7) formed in a cylindrical portion 31 of the lower housing 3L, the horizontally extending portion 21 is located in the cylindrical portion 31 of the lower housing 3L. As shown in FIG. 6, a portion other than the base end portion of the horizontally extending portion 21 is held in the insertion hole 314 formed in the cylindrical portion 31 of the lower housing 3L, and thereby the lower contact pin 2L is held by the lower housing 3L.

The contact portion 22 is a columnar portion linearly extending from the tip end portion of the horizontally extending portion 21 toward the tip side. Further, the contact portion 22 protrudes from the cylindrical portion 31 of the lower housing 3L toward the tip side so as to be exposed to the outside in a state that the lower contact pin 2L is held by the lower housing 3L. When the electrical connector 1 and the mating connector 200 are coupled with each other, the contact portion 22 contacts with the corresponding contact pin 220 of the mating connector 200 to provide the electrical connection between the mating connector 200 and the electrical connector 1.

The connection portion 23 is a plate-like portion for connecting the horizontally extending portion 21 and the downwardly extending portion 24. The connection portion 23 is curved from the base end portion of the horizontally extending portion 21 toward the lower side. The downwardly extending portion 24 is a plate-like portion linearly extending from the lower end portion of the connection portion 23 toward the lower side. The downwardly extending portion 24 is located in a downwardly extending portion 32 (see FIG. 7) of the lower housing 3L in the state that the lower contact pin 2L is held by the lower housing 3L. The terminal portion 25 is a conical portion formed so as to protrude from the lower end portion of the downwardly extending portion 24 toward the lower side. The terminal portion 25 extends from the lower contact pin 2L toward the lower side so as to be exposed to the outside in the state that the lower contact pin 2L is held by the lower housing 3L. The terminal portion 25 should be connected to the corresponding terminal 120 (see FIG. 3) of the circuit board 100.

The pair of press-fitting shoulders 26 are plate-like portions respectively extending in the width direction of the lower contact pin 2L (the X direction) from the both side portions (the both side surfaces in the X direction) of the base end portion of the horizontally extending portion 21. A thickness (a length in the Y direction) of each of the pair of press-fitting shoulders 26 is the same as a thickness of the horizontally extending portion 21. Thus, an upper surface of the horizontally extending portion 21 and upper surfaces of the pair of press-fitting shoulders 26 are located on one plane. Similarly, a lower surface of the horizontally extending portion 21 and lower surfaces of the pair of press-fitting shoulders 26 are also located on another one plane.

Each of the pair of press-fitting shoulders 26 has a tapered shape whose width (a length in the X direction) gradually decreases from the base side (the −Z direction side) toward the tip side (the +Z direction side). Further, each of base end surfaces (−Z direction end surfaces) of the pair of press-fitting shoulders 26 is a flat surface perpendicular to the insertion and extraction direction of the mating connector 200 (the Z direction). The lower contact pin 2L is press-fitted into the insertion hole 314 of the lower housing 3L by pressing the base end surfaces of the pair of press-fitting shoulders 26 with a press-fitting tool which has a pair of pressing protrusions spaced apart from each other (such a press-fitting tool is disclosed, for example, in Japanese Unexamined Patent Application Publication (JP-A) No. 2022-149019).

The pair of first protruding portions 27 are portions respectively protruding in the width direction of the lower contact pin 2L (the outward direction) from the both side surfaces of the portion located closer to the tip side than the portion of the horizontally extending portion 21 where the pair of press-fitting shoulders 26 are formed. Each of the pair of first protruding portions 27 has a function of increasing locking force of the lower contact pin 2L in the insertion hole 314 by being pressed toward the inner side by the inner surface of the insertion hole 314 of the lower housing 3L in a state that the lower housing 3L is inserted into an aftermentioned insertion hole 53 of the shell 5 and the lower housing 3L is held in the shell 5. In the illustrated aspect, a thickness (a length in the Y direction) of each of the pair of first protruding portions 27 is the same as a thickness of the horizontally extending portion 21. Thus, the upper surface of the horizontally extending portion 21 and upper surfaces of the pair of first protruding portions 27 are located on one plane. Similarly, the lower surface of the horizontally extending portion 21 and lower surfaces of the pair of first protruding portions 27 are also located on another one plane. However, the present disclosure is not limited thereto.

The scope of the disclosure also involves an aspect in which the thickness of each of the pair of first protruding portions 27 is different from the thickness of the horizontally extending portion 21, the upper surface of the horizontally extending portion 21 and the upper surfaces of the pair of first protruding portions 27 are not located on one plane, and the lower surface of the horizontally extending portion 21 and the lower surfaces of the pair of first protruding portions 27 are not located on another one plane. The thickness of the horizontally extending portion 21, the thickness of each of the pair of press-fitting shoulders 26 and the thickness of each of the pair of first protruding portions 27 may be appropriately set to different values according to a shape, a state and the like of the lower housing 3L into which the lower contact pin 2L is press-fitted.

Each of the pair of first protruding portions 27 has a tapered shape whose width (the length in the X direction) gradually decreases from the base side (the −Z direction side) toward the tip side (the +Z direction side). Further, each of base end surfaces (−Z direction end surfaces) of the pair of first protruding portions 27 is a flat surface perpendicular to the insertion and extraction direction of the mating connector 200 (the Z direction). An amount of protrusion of each of the pair of first protruding portions 27 in the width direction of the lower contact pin 2L is set so that at least parts (tip end portions) of the pair of first protruding portions 27 are embedded in the inner surface of the cylindrical portion 31 of the lower housing 3L when the lower housing 3L is press-fitted into the insertion hole 53 of the shell 5 in a state that at least the lower contact pin 2L is press-fitted into the insertion hole 314 of the lower housing 3L.

When the lower contact pin 2L is press-fitted into the insertion hole 314 of the lower housing 3L, the pair of first protruding portions 27 contact with the inner surface of the insertion hole 314 of the cylindrical portion 31 (see FIG. 14). Further, when the electrical connector 1 is assembled, the cylindrical portion 31 of the lower housing 3L is inserted into the insertion hole 53 of the shell 5. At this time, an after-mentioned pair of pressing ribs 312 are pressed by an inner surface of the insertion hole 53, so that the lower housing 3L is held by the shell 5. Further, since the pair of pressing ribs 312 are pressed toward the inner side and portions of the cylindrical portion 31 where the pair of pressing ribs 312 are formed are deformed toward the inner side, the lower contact pin 2L is pressed from the outside by the inner surface of the insertion hole 314 and the lower contact pin 2L is held in the insertion hole 314.

Further, when the cylindrical portion 31 of the lower housing 3L is inserted into the insertion hole 53 of the shell 5, outer surfaces of the pair of pressing ribs 312 of the cylindrical portion 31 are respectively pressed by an after-mentioned pair of first guide portions 533 (see FIG. 21) which are formed on the inner surface of the insertion hole 53 of the shell 5.

Thus, the portions of the cylindrical portion 31 where the pair of pressing ribs 312 are formed are elastically deformed toward the inner side. As a result, the inner surfaces of at least the portions of the cylindrical portion 31 where the pair of pressing ribs 312 are formed are pressed against the pair of first protruding portions 27 of the lower contact pin 2L, so that at least the part (the tip end portion) of each of the first protruding portions 27 is held by the inner surface of the cylindrical portion 31 of the lower housing 3L so as to be embedded in the inner surface of the cylindrical portion 31. With this configuration, it is possible to increase the locking force of the lower contact pin 2L in the insertion hole 314 of the lower housing 3L. Therefore, even when strong force is applied to the lower contact pin 2L in the rearward direction (the −Z direction) by the mating connector 200, it is possible to effectively prevent the lower contact pin 2L from being shifted toward the rear side in the lower housing 3L or removed from the lower housing 3L.

Although the pair of first protruding portions 27 are formed on the both side surfaces of the horizontally extending portion 21 in the illustrated aspect, the number of first protruding portions 27 is not limited thereto. One, three or more first protruding portions 27 may be formed on the side surface or side surfaces of the horizontally extending portion 21.

For example, an aspect in which one or more first protruding portions 27 may be formed on one side of the horizontally extending portion 21 is also involved in the scope of the present disclosure. By forming the first protruding portion 27 so as to protrude in the width direction of the lower contact pin 2L from the side surface of the horizontally extending portion 21 located closer to the tip side than the portion where the pair of press-fitting shoulders 26 are formed, it is possible to increase the locking force of the lower contact pin 2L in the insertion hole 314 of the lower housing 3L in the state that the cylindrical portion 31 of the lower housing 3L is inserted into the insertion hole 53 of the shell 5. Therefore, it is possible to prevent the lower contact pin 2L from being shifted toward the rear side in the lower housing 3L or removed from the lower housing 3L.

The pair of second protruding portions 28 respectively protrude in the width direction of the lower contact pin 2L (the outward direction) from both side surfaces of a portion of the horizontally extending portion 21, which is located closer to the tip side than the portion where at least the pair of first protruding portions 27 of the horizontally extending portion 21 are formed. Each of the pair of second protruding portions 28 has a function of increasing the locking force of the lower contact pin 2L in the insertion hole 314 by contacting with the inner surface of the insertion hole 314 in the state that the lower contact pin 2L is inserted into the insertion hole 314 of the lower housing 3L. Since the locking force provided by the pair of second protruding portions 28 contacting with the inner surface of the insertion hole 314 is also applied in addition to the above-mentioned locking force provided by the pair of first protruding portions 27 which are embedded in the inner surface of the insertion hole 314, it is possible to more reliably prevent the lower contact pin 2L from being shifted toward the rear side in the lower housing 3L or removed from the lower housing 3L.

The above-mentioned lower contact pin 2L is press-fitted into the insertion hole 314 of the lower housing 3L and held by the lower housing 3L. Similarly, the upper contact pin 2U is press-fitted into the insertion hole 314 of the upper housing 3U and held by the upper housing 3U. Each of the lower housing 3L and the upper housing 3U is made of an insulating material having elasticity such as a resin material. Each of the lower housing 3L and the upper housing 3U includes the cylindrical portion 31 extending in the insertion and extraction direction of the mating connector 200 and the downwardly extending portion 32 extending from a base end portion of the cylindrical portion 31 toward the lower side as shown in FIG. 7. The lower housing 3L and the upper housing 3U have the same configuration except that lengths of the cylindrical portion 31 and the downwardly extending portion 32 are different. Thus, the configuration of the lower housing 3L will be described in detail with reference to FIGS. 10 and 11 and description for the configuration of the upper housing 3U will be omitted.

The cylindrical portion 31 is a cylindrical member linearly extending in the insertion and extraction direction of the mating connector 200 (the Z direction) as shown in FIGS. 10 and 11. An outer diameter of the cylindrical portion 31 is substantially equal to or slightly smaller than an inner diameter of a body portion 41 of the outer contact 4. The cylindrical portion 31 includes four ribs 311 formed on an outer peripheral surface of the cylindrical portion 31, the pair of pressing ribs 312 formed on the outer peripheral surface of the cylindrical portion 31 and respectively formed at positions corresponding to the pair of first protruding portions 27 of the lower contact pin 2L, a pair of locking ribs 313 formed on an upper portion and a lower portion of the outer peripheral surface of the cylindrical portion 31 at a portion covered with the outer contact 4, the insertion hole 314 passing through the cylindrical portion 31 in the insertion and extraction direction of the mating connector 200, a ceiling portion 315 extending from an upper portion of the base end surface of the cylindrical portion 31 toward the base side and a concave portion 33 formed on the base end surface of the cylindrical portion 31 so as to open toward the base side.

The four ribs 311 are protruding portions formed on the outer peripheral surface of the cylindrical portion 31 so as to linearly extend in the insertion and extraction direction of the mating connector 200 (the Z direction). Although the four ribs 311 are formed at equal angular intervals on the outer peripheral surface of the cylindrical portion 31 in the illustrated aspect, the present disclosure is not limited thereto. Further, the four ribs 311 may be formed at any angular interval on the outer peripheral surface of the cylindrical portion 31. Further, the number of ribs 311 formed on the outer peripheral surface of the cylindrical portion 31 is not limited thereto. Three, five or more ribs 311 may be formed on the outer peripheral surface of the cylindrical portion 31.

Since the outer diameter of the cylindrical portion 31 is substantially equal to or slightly smaller than the inner diameter of the body portion 41 of the outer contact 4, when the lower housing 3L is press-fitted into the body portion 41 of the outer contact 4, the four ribs 311 are elastically deformed and contact with an inner peripheral surface of the body portion 41 of the outer contact 4. With this configuration, the four ribs 311 are elastically deformed toward the inner side, thereby enabling to apply tightening force by the outer contact 4 to the lower housing 3L. As a result, it is possible to ensure concentricity between the lower housing 3L and the outer contact 4. Furthermore, the tightening force can prevent the lower housing 3L from being removed from the outer contact 4. Further, it is possible to improve the signal transmission characteristics of the electrical connector 1 since the concentricity between the lower housing 3L and the outer contact 4 is ensured.

The pair of pressing ribs 312 are formed for preventing the lower contact pin 2L from being shifted in the cylindrical portion 31 of the lower housing 3L toward the rear side and removed from the cylindrical portion 31 of the lower housing 3L. Further, the pair of pressing ribs 312 are formed for preventing the lower housing 3L from being removed from the insertion hole 53 of the shell 5. Each of the pair of pressing ribs 312 is formed on a side portion (a portion in the X direction) of the outer peripheral surface of the cylindrical portion 31 at the position corresponding to each of the pair of first protruding portions 27 of the lower contact pin 2L. The pair of pressing ribs 312 face each other through the insertion hole 314 of the cylindrical portion 31 of the lower housing 3L (i.e., facing each other at an angular interval of 180 degrees). Each of the pair of pressing ribs 312 linearly extends in the insertion and extraction direction of the mating connector 200. Further, each of the pair of pressing ribs 312 is formed so as to protrude toward the outside from the outer peripheral surface of the cylindrical portion 31. Each of the pair of pressing ribs 312 has a substantially semicircular shape in a planar view viewed from the insertion and extraction direction of the mating connector 200.

A position of each of the pair of pressing ribs 312 and a length of extension of each of the pair of pressing ribs 312 in the insertion and extraction direction of the mating connector 200 are appropriately set so that an area of the inner surface of the insertion hole 314 can be elastically deformed toward the inner side. The area of the inner surface of the insertion hole 314 is elastically deformed toward the inner side enough to hold the pair of first protruding portions 27 of the lower contact pin 2L so that the pair of first protruding portions 27 are embedded in the inner surface of the insertion hole 314 of the lower housing 3L. As shown in FIG. 15, each of the pair of pressing ribs 312 is formed on the outer peripheral surface of the cylindrical portion 31 at a position so as to be exposed without being covered by the body portion 41 of the outer contact 4 when the lower housing 3L is press-fitted into the body portion 41 of the outer contact 4. Further, each of the pair of pressing ribs 312 has a length of extension so as to be exposed without being covered by the body portion 41 of the outer contact 4 when the lower housing 3L is press-fitted into the body portion 41 of the outer contact 4.

The pair of pressing ribs 312 are respectively inserted into an after-mentioned pair of second guide portions 534 (see FIG. 21) which are concave portions formed on the inner surface of the insertion hole 53 of the shell 5. Further, a sum of the outer diameter of the cylindrical portion 31 of the lower housing 3L and an amount of protrusion of each of the pair of pressing ribs 312 from the outer peripheral surface of the cylindrical portion 31 of the lower housing 3L toward the outside is larger than a sum of an inner diameter of the insertion hole 53 and a depth (a depression amount) of each of the pair of second guide portions 534. With this configuration, each of the pair of pressing ribs 312 is pressed toward the inner side by the inner surface of the insertion hole 53 of the shell 5 (more specifically, by the second guide portion 534 formed on the inner surface of the insertion hole 53) in the state that the cylindrical portion 31 is inserted into the insertion hole 53 and the lower housing 3L is held by the shell 5.

Furthermore, since the lower housing 3L is made of the insulating material having elasticity, the lower housing 3L can be elastically deformed toward the inner side. Thus, the pair of pressing ribs 312 are pressed toward the inner side by the inner surface of the insertion hole 53 when the lower housing 3L is press-fitted into the insertion hole 53 of the shell 5, so that the portions of the cylindrical portion 31 where the pair of pressing ribs 312 are formed are elastically deformed toward the inner side. Thus, the inner surface of the insertion hole 314 presses the pair of first protruding portions 27 of the lower contact pin 2L toward the inner side.

With this configuration, at least the parts (the tip portions in the X direction) or all parts of first protruding portions 27 of the lower contact pin 2L are held so as to be embedded in the inner surface of the insertion hole 314 of the lower housing 3L as shown in FIG. 16. Thus, it is possible to increase the locking force of the lower contact pin 2L in the insertion hole 314 of the lower housing 3L and to prevent the lower contact pin 2L from being shifted in the lower housing 3L toward the rear side or removed from the lower housing 3L in the state that the cylindrical portion 31 of the lower housing 3L is inserted into the insertion hole 53 of the shell 5.

As shown in FIG. 16, when the cylindrical portion 31 of the lower housing 3L is inserted into the insertion hole 53 of the shell 5, the pair of pressing ribs 312 are respectively contained in the pair of second guide portions 534 formed on the inner surface of the insertion hole 53 of the shell 5 in a compressed state. Thus, the cylindrical portion 31 is fixed to the insertion hole 53, thereby preventing backlash and rotation of the lower housing 3L in the insertion hole 53.

The pair of locking ribs 313 are formed for preventing the lower housing 3L from being removed from the outer contact 4 in a state that the outer contact 4 covers the outer peripheral surface of the cylindrical portion 31 of the lower housing 3L. Each of the pair of locking ribs 313 is a protruding portion linearly extending in the insertion and extraction direction of the mating connector 200. As shown in FIG. 12, one of the pair of locking ribs 313 is formed on the upper side of the outer peripheral surface of the cylindrical portion 31 of the lower housing 3L and formed at the portion covered with the outer contact 4. The other of the pair of locking ribs 313 is formed on the lower side on the outer peripheral surface of the cylindrical portion 31 of the lower housing 3L and formed at the portion covered with the outer contact 4. Thus, the pair of locking ribs 313 face each other through the insertion hole 314 of the cylindrical portion 31 of the lower housing 3L. In an enlarged view of a vicinity of the locking rib 313 in FIG. 12, an outer shape of the cylindrical portion 31 is shown with a dotted line. A portion protruding from the outer shape of the cylindrical portion 31 shown with the dotted line toward the outside is the locking rib 313.

Further, an after-mentioned pair of locking protrusions 44 are respectively formed on the inner surface of the outer contact 4 at positions corresponding to the pair of locking ribs 313. Thus, in a state that the cylindrical portion 31 of the lower housing 3L is inserted into the body portion 41 of the outer contact 4, the pair of locking protrusions 44 respectively compress and elastically deform the pair of locking ribs 313 toward the inner side. As a result, the pair of locking protrusions 44 respectively engage with the pair of locking ribs 313. With this configuration, engaging the pair of locking protrusions 44 of the outer contact 4 and the pair of locking ribs 313 of the lower housing 3L can effectively prevent the lower housing 3L from being removed from the outer contact 4 when force is applied to the lower housing 3L in the insertion and extraction direction of the mating connector 200.

In the illustrated embodiment, although each of the pair of locking ribs 313 is formed on the upper portion and the lower portion of the cylindrical portion 31 of the lower housing 3L, the number and position of the locking ribs 313 are not limited thereto. An aspect in which one, three, or more locking ribs 313 are formed on the outer peripheral surface of the cylindrical portion 31 of the lower housing 3L is also within the scope of the present disclosure. In this case, the number and the position of the locking protrusions 44 of the outer contact 4 are appropriately modified depending on the number and the position of the locking ribs 313.

Referring back to FIGS. 10 and 11, the insertion hole 314 is formed at a center of the cylindrical portion 31 so as to pass through the cylindrical portion 31 in the insertion and extraction direction of the mating connector 200. The lower contact pin 2L is press-fitted into the insertion hole 314 as described above. The insertion hole 314 has a shape corresponding to the shape of the horizontally extending portion 21 of the lower contact pin 2L and a part of the lower contact pin 2L other than the base end portion of the horizontally extending portion 21 is held in the insertion hole 314.

The ceiling portion 315 is a portion extending from the upper portion of the base end surface of the cylindrical portion 31 toward the base side so as to cover the connection portion 23 and the downwardly extending portion 24 of the lower contact pin 2L from the upper side through a gap therebetween. The ceiling portion 315 protrudes from the base end surface of the cylindrical portion 31 toward the base side so that an upper surface of the ceiling portion 315 is continuous with the outer peripheral surface of the cylindrical portion 31. A lower surface of the ceiling portion 315 is a flat surface perpendicular to the Y-axis.

The downwardly extending portion 32 is a portion for containing the downwardly extending portion 24 of the lower contact pin 2L therein when the lower contact pin 2L is held by the lower housing 3L. The downwardly extending portion 32 includes a front plate 321 extending from a lower portion of the base end surface of the cylindrical portion 31 toward the lower side and a pair of wall portions 322 extending from both width-direction (the X direction) edges of the front plate 321 toward the base side.

The front plate 321 is a plate-like portion vertically extending from the lower portion of the base end surface of the cylindrical portion 31 toward the lower side. When insertion of the cylindrical portion 31 of the lower housing 3L from the base side into the insertion hole 53 (see FIG. 7) of the shell 5 is completed, the tip end surface of the front plate 321 abuts against an inner surface of the body portion 51 of the shell 5 (in the case of the upper housing 3U, the tip end surface of the front plate 321 abuts against a base end surface of an after-mentioned body portion 61 of the shield member 6). The pair of wall portions 322 are plate-like portions respectively extending from the both width-direction edges of the front plate 321 toward the base side. A base end surface of the front plate 321 and inner surfaces of the pair of wall portions 322 define an internal space of the downwardly extending portion 32. When the lower contact pin 2L is held by the lower housing 3L, the downwardly extending portion 24 of the lower contact pin 2L is located in the internal space of the downwardly extending portion 32 of the lower housing 3L.

Each of the pair of wall portions 322 has a locking piece 323 formed in the upper portion for locking the lower contact pin 2L in the lower housing 3L and a notch 324 formed below the locking piece 323. The locking piece 323 supports the downwardly extending portion 24 of the lower contact pin 2L from the base side and locks the lower contact pin 2L in the lower housing 3L in a state that the lower contact pin 2L is contained in the lower housing 3L. The locking piece 323 is a tapered plate-shaped portion extending from an upper portion of each of the both width-direction edges of the front plate 321 toward the base side. The locking piece 323 can be elastically deformed toward the inner side (in a direction of an arrow in FIG. 13). The locking piece 323 is separated from a lower portion (a part other than the locking piece 323) of the wall portion 322 by the notch 324. Thus, a lower surface of the locking piece 323 faces an upper surface of the lower portion of the wall portion 322 through the notch 324.

Specifically, each locking piece 323 includes an inner surface linearly extending from an end portion of the base end surface of the front plate 321 in the width direction (the X direction) toward the base side and an outer surface obliquely extending from an end portion of the base end surface of the front plate 321 in the width direction (the X direction) toward the base side and the outer side. As a result, a width of the locking piece 323 gradually increases from the tip side toward the base side (see FIG. 14). As shown in FIG. 16, when the cylindrical portion 31 of the lower housing 3L is inserted into the insertion hole 53 of the shell 5, the outer surface of each locking piece 323 of the lower housing 3L contacts the inner surface of the body portion 51 of the shell 5 and is elastically deformed toward the inner side. Thus, the inner surface of the locking piece 323 supports the downwardly extending portion 24 of the lower contact pin 2L from the base side. With this configuration, it is possible to lock the downwardly extending portion 24 of the lower contact pin 2L in the downwardly extending portion 32 of the lower housing 3L. As a result, it is possible to effectively prevent the lower contact pin 2L from being removed from the lower housing 3L.

Referring back to FIGS. 11 and 12, the notch 324 is formed above a center of a height (the Y direction) of each of the pair of wall portions 322 in the illustrated embodiment (i.e., the notch 324 is formed in the +Y direction from the center of the height of each of the pair of wall portions 322). Forming the notch 324 at each of the pair of wall portions 322 enhances elasticity of the pair of locking pieces 323 toward the inner side (the X direction). As a result, it is possible to reduce force required when the lower housing 3L is press-fitted to the shell 5, that is, force required to elastically deform the pair of locking pieces 323 toward the inner side.

A position of the locking piece 323 is not limited to the upper portion of each of the pair of wall portions 322 of the downwardly extending portion 32. The locking piece 323 may be formed at the lower portion of the pair of wall portions 322 of the downwardly extending portion 32. Alternatively, an entire wall portion 322 or a part of the wall portion 322 may have the same configuration as that of the locking piece 323 without providing the notch 324 and may be configured to be elastically deformable toward the inner side. In this case, the inner surfaces of the entire pair of wall portions 322 or the part of the pair of wall portions 322 contact with the downwardly extending portion 24 of the lower contact pin 2L from the base side, thereby preventing the lower contact pin 2L from being removed from the lower housing 3L.

The concave portion 33 contains the pair of press-fitting shoulders 26 of the lower contact pin 2L therein when the lower contact pin 2L is held by the lower housing 3L. As shown in FIG. 11, the concave portion 33 is formed in the base end surface of the cylindrical portion 31 so as to open toward the base side and communicates with the insertion hole 314. As shown in FIGS. 13 and 14, the pair of press-fitting shoulders 26 are received in the concave portion 33 in the state that the lower contact pin 2L is press-fitted into the insertion hole 314.

FIG. 15 shows a state that the outer contact 4 is attached to the lower housing 3L holding the lower contact pin 2L therein. As shown in FIG. 15, tip side portions of the ribs 311 of the lower housing 3L and tip side portions of the locking ribs 313 are inserted into the body portion 41 of the outer contact 4 in a compressed state. The pressing ribs 312 of the lower housing 3L are not covered by the body portion 41 of the outer contact 4 and are exposed toward the outside. Further, the contact portion 22 of the lower contact pin 2L protrudes from the cylindrical portion 31 of the lower housing 3L toward the tip side. The downwardly extending portion 24 of the lower contact pin 2L is contained in the downwardly extending portion 32 of the lower housing 3L. The terminal portion 25 of the lower contact pin 2L protrudes from the downwardly extending portion 32 of the lower housing 3L toward the lower side.

Although a relationship between the lower contact pin 2L and the lower housing 3L and an effect of increasing the locking force of the lower contact pin 2L in the insertion hole 314 by the pair of pressing ribs 312 of the lower housing 3L being pressed toward the inner side by the inner surface of the insertion hole 53 of the shell 5 (specifically, by the second guide portion 534 formed on the inner surface of the insertion hole 53) have been described in detail with reference to FIGS. 13 to 16, this description can be also applied to the upper contact pin 2U and the upper housing 3U.

Referring back to FIG. 7, the four outer contacts 4 serve as external conductors respectively covering the cylindrical portions 31 of the two lower housings 3L and the two upper housings 3U from the outside. When the mating connector 200 is coupled with the electrical connector 1, the four outer contacts 4 respectively contact with corresponding outer contacts 230 (see FIG. 24) of the mating connector 200 to equalize a ground potential of the electrical connector 1 and a ground potential of the mating connector 200. Since all of the four outer contacts 4 have the same configuration except that attachment angles with respect to the shell 5 are different from each other, one outer contact 4 will be described in detail as a representative.

As shown in FIG. 17, the outer contact 4 is a cylindrical member made of a metallic material. The outer contact 4 includes a cylindrical body portion 41, four ribs 42 protruding from an outer peripheral surface of the body portion 41 toward the outside, a pair of positioning protrusions 43 protruding from the outer peripheral surface of the body portion 41 toward the outside and the pair of locking protrusions 44 formed on the inner peripheral surface of the body portion 41 at positions respectively corresponding to the pair of locking ribs 313 on the lower housing 3L so as to protrude toward the inner side.

The body portion 41 is a cylindrical member linearly extending in the insertion and extraction direction of the mating connector 200 (the Z direction). The four ribs 42 are formed for preventing the outer contact 4 from being removed from the insertion hole 53 of the shell 5 due to a weight of the outer contact 4 and for ensuring a concentricity between the outer contact 4 and the insertion hole 53 of the shell 5. The four ribs 42 are formed at equal angular intervals on an outer peripheral surface of a base side portion of the body portion 41 so as to linearly extend in the insertion and extraction direction of the mating connector 200. The four ribs 42 abut against an inner surface of the insertion hole 53 of the shell 5 when the outer contact 4 is press-fitted into the insertion hole 53 of the shell 5, and thereby the outer contact 4 is fixed in the insertion hole 53 of the shell 5.

Further, the four ribs 42 of the outer contact 4 are pressed onto the inner surface of the insertion hole 53 of the shell 5 by the press-fitting, thereby electrically connecting the outer contact 4 and the shell 5 with sureness. The shell 5 is electrically connected to the ground terminals 110 of the circuit board 100 through the ground terminals 55 as described later. Thus, it is possible to surely make the electric potential of the outer contact 4 equal to the ground potential by electrically connecting the outer contact 4 and the shell 5 with sureness. This makes it possible to stabilize the signal transmission characteristics of the electrical connector 1.

Although the four ribs 42 are formed at the equal angular intervals on the outer peripheral surface of the base side portion of the body portion 41 in the illustrated embodiment, the number of ribs 42 formed at the equal angular intervals on the outer peripheral surface of the base side portion of the body portion 41 is not limited thereto. Three, five or more ribs 42 may be formed at equal angular intervals on the outer peripheral surface of the base side portion of the body portion 41.

The pair of positioning protrusions 43 are provided for regulating the attachment angle of the outer contact 4 with respect to the shell 5. Each of the pair of positioning protrusions 43 is a plate-like portion formed so as to linearly extend from the outer peripheral surface of the body portion 41 toward the outside. The pair of positioning protrusions 43 face each other through a gap therebetween. Each of the pair of positioning protrusions 43 has a base end portion integrated with the outer peripheral surface of the body portion 41 and linearly extends in a radial direction of the body portion 41. A height of each of the pair of positioning protrusions 43 is higher than a height of each of the four ribs 42 formed on the outer peripheral surface of the body portion 41. The outer contact 4 is press-fitted into the insertion hole 53 of the shell 5 in a posture that the pair of positioning protrusions 43 are inserted into an after-mentioned positioning concave portion 531 of the shell 5 (see FIG. 20). Thus, the attachment angle of the outer contact 4 with respect to the shell 5 is regulated.

The pair of locking protrusions 44 can prevent the lower housing 3L from being removed from the body portion 41 of the outer contact 4. As shown in FIG. 18, each of the pair of locking protrusions 44 is formed on the inner peripheral surface of the body portion 41 so as to protrude toward the inner side. Further, the pair of locking protrusions 44 are formed at positions respectively corresponding to the pair of locking ribs 313 formed on the outer peripheral surface of the cylindrical portion 31 of the lower housing 3L. In the illustrated embodiment, the pair of locking protrusions 44 facing each other and formed at the upper portion and the lower portion on the inner peripheral surface of the body portion 41 respectively correspond to the pair of locking ribs 313 formed at the upper portion and the lower portion on the outer peripheral surface of the cylindrical portion 31 of the lower housing 3L.

As shown in FIG. 18, each locking protrusion 44 has a base end portion 441 formed so as to be continuous with the inner peripheral surface of the body portion 41, an inwardly extending portion 442 obliquely extending from the base end portion 441 toward the tip side and the inner side, and a tip end surface 443 which is a flat surface perpendicular to the insertion and extraction direction of the mating connector 200. The locking protrusion 44 having such a shape can be obtained by subjecting a cut-and-raise process to a part of the inner peripheral surface of the body portion 41. For example, the cut-and-raise process for obtaining the locking protrusion 44 may be performed as follows. Firstly, one X-axis slit along the X direction passing through from the outer peripheral surface to the inner peripheral surface of the body portion 41 of the outer contact 4 and a pair of Z-axis slits passing through from the outer peripheral surface to the inner peripheral surface of the body portion 41 of the outer contact 4 and extending from both end portions of one X-axis slit toward the base side are formed. Secondly, a load is applied to a portion between the pair of Z-axis slits from the outside toward the inner side to raise a part of the body portion 41 toward the inner side. However, the method of obtaining the locking protrusion 44 is not limited thereto. Any method may be used as long as the locking protrusion 44 having the above-described structure protruding from the inner peripheral surface of the outer contact 4 can be realized.

The base end portion 441 of the locking protrusion 44 is formed so as to be continuous with the inner peripheral surface of the body portion 41. Thus, each of the pair of locking ribs 313 of the lower housing 3L can move to the tip side while sliding on the base end portion 441 and the inwardly extending portion 442 of the locking protrusion 44 when the cylindrical portion 31 of the lower housing 3L is inserted into the body portion 41.

As shown in FIG. 19, each of the pair of locking ribs 313 of the lower housing 3L is compressed by the inwardly extending portion 442 of each of the pair of locking protrusions 44 of the outer contact 4 in a state that the press-fitting of the cylindrical portion 31 of the lower housing 3L into the body portion 41 of the outer contact 4 is completed and the outer contact 4 covers the cylindrical portion 31. At this time, each of the pair of locking ribs 313 of the lower housing 3L engages with a corresponding locking protrusion 44 of the outer contact 4.

In the state that the press-fitting of the cylindrical portion 31 of the lower housing 3L into the body portion 41 of the outer contact 4 is completed, the tip end portion of the inwardly extending portion 442 and the tip end surface 443 press the corresponding locking rib 313 of the lower housing 3L and elastically deform the corresponding locking rib 313 toward the inner side. As a result, the tip end portion of the inwardly extending portion 442 and the tip end surface 443 firmly engage with the locking rib 313. In particular, since the tip end surface 443 of the locking protrusion 44 is a flat surface substantially perpendicular to the insertion and extraction direction of the mating connector 200, the engagement of the tip end portion of the inwardly extending portion 442 and the tip end surface 443 with the locking rib 313 provides a strong resistance to a movement of the cylindrical portion 31 toward the base side in the body portion 41.

When a force is applied in a direction in which the cylindrical portion 31 of the lower housing 3L is pulled out from the body portion 41 of the outer contact 4 to the base side, engaging the locking rib 313 with the tip end portion of the inwardly extending portion 442 and the tip end surface 443 of the corresponding locking protrusion 44 prevents the cylindrical portion 31 from being moved toward the base side. Thus, it is possible to effectively prevent the cylindrical portion 31 from being removed from the body portion 41.

Although the pair of locking protrusions 44 are formed on the inner peripheral surface of the body portion 41 in the illustrated embodiment, the number of pairs of locking protrusions 44 is not limited thereto. For example, two or more pairs of locking protrusions 44 may be formed on the inner peripheral surface of the body portion 41. It is possible to prevent the cylindrical portion 31 of the lower housing 3L from being removed from the body portion 41 of the outer contact 4 by forming at least one pair of locking protrusions 44 on the inner peripheral surface of the body portion 41 at positions corresponding to at least one pair of locking ribs 313 of the lower housing 3L.

Referring back to FIG. 7, the shell 5 serves as a housing for containing each component of the electrical connector 1 therein and as an electrical path for electrically connecting the four outer contacts 4 and ground terminals 110 on the circuit board 100. As shown in FIGS. 20 and 21, the shell 5 is a box-like member made of a metallic material. The shell 5 includes a body portion 51 constituted of a front plate 511, a pair of side walls 512 and a top plate 513, a positioning convex portion 52 formed on a tip end surface of the front plate 511 of the body portion 51, the four insertion holes 53 passing through the front plate 511 of the body portion 51 and the positioning convex portion 52, a pair of reinforcing portions 54 respectively formed so as to protrude from a lower portion (a portion located in the −Y direction) of each of the pair of side walls 512 of the body portion 51, four ground terminals 55 extending from a lower end portion of the body portion 51 toward the lower side, a pair of wall portions 56 formed on each of the pair of side walls 512 of the body portion 51 so as to be spaced apart from each other in the Y direction, a cover receiving portion 57 formed on an outer surface of each of the pair of side walls 512 and a partition portion 58 for preventing electromagnetic interference between the two lower housings 3L and electromagnetic interference between the two upper housings 3U inside the body portion 51.

The body portion 51 includes the front plate 511, the pair of side walls 512 respectively extending from wide-direction end portions of the front plate 511 toward the base side and the top plate 513 extending from an upper end portion of the front plate 511 toward the base side. The body portion 51 has a box-like shape opened toward the base side and the lower side. The components of the electrical connector 1 are contained in an internal space of the body portion 51 defined by inner surfaces of the front plate 511, the pair of side walls 512 and the top plate 513.

As shown in FIG. 20, the positioning convex portion 52 is formed so as to protrude from the tip end surface of the front plate 511 of the body portion 51 toward the tip side. A pair of relief portions 521 are respectively formed on both side surfaces of the positioning convex portion 52 of the body portion 51 located in the X direction. The pair of relief portions 521 are provided for positioning the cover 7 with respect to the shell 5. The pair of relief portions 521 are formed at positions and in shapes corresponding to an after-mentioned pair of positioning protrusions 74 of the cover 7. Thus, positioning of the cover 7 with respect to the shell 5 is performed by respectively inserting the pair of positioning protrusions 74 of the cover 7 into the pair of relief portions 521.

The four insertion holes 53 are circular holes formed so as to pass through the front plate 511 of the body portion 51 and the positioning convex portion 52 in the insertion and extraction direction of the mating connector 200 (the Z direction). The four outer contacts 4 are respectively press-fitted into the four insertion holes 53 from the tip side. Each of the insertion holes 53 includes the positioning concave portion 531 for receiving the pair of positioning protrusions 43 of the outer contact 4, a stop surface 532 for stopping insertion of the outer contact 4, the two first guide portions 533 for respectively guiding the upper two of the four ribs 311 of the lower housing 3L or the upper housing 3U, the pair of second guide portions 534 for respectively guiding the pair of pressing ribs 312 of the lower housing 3L or the upper housing 3U, and a third guide portion 535 for guiding an upper locking rib 313 of the pair of locking ribs 313 of the lower housing 3L or the upper housing 3U.

The positioning concave portion 531 is formed for receiving the pair of positioning protrusions 43 of the outer contact 4. The positioning concave portion 531 is formed on the front plate 511 so as to communicate with the insertion hole 53 and extend in a radial direction of the insertion hole 53. The outer contact 4 is press-fitted into the insertion hole 53 of the shell 5 in the posture that the pair of positioning protrusions 43 are located in the positioning concave portion 531. With this configuration, it becomes possible to position the outer contact 4 with respect to the shell 5. In a state that the outer contact 4 is press-fitted into the insertion hole 53 of the shell 5, the pair of positioning protrusions 43 are located in the positioning concave portion 531 and base end surfaces of the pair of positioning protrusions 43 abut against the positioning concave portion 531 of the shell 5.

Further, in a state that the outer contact 4 is press-fitted into the insertion hole 53 of the shell 5 and the base end surfaces of the pair of positioning protrusions 43 of the outer contact 4 abut against the positioning concave portion 531, the tip end surfaces of the pair of positioning protrusions 43 are located on substantially the same plane as the tip end surface of the positioning concave portion 531. Further, four protrusions 73 on four press-fitting concave portions 72 respectively formed at positions corresponding to the four positioning concave portions 531 on the base end surface of the cover 7 are formed so that the base end portions of the protrusions 73 respectively abut against the tip end portions of the positioning protrusions 43 when the cover 7 is attached to the shell 5 as described later. Thus, when the cover 7 is attached to the shell 5, the pair of positioning protrusions 43 of the outer contact 4 are sandwiched between the shell 5 and the cover 7. With this configuration, it is possible to prevent the outer contact 4 from being removed from the insertion hole 53 of the shell 5 and it is also possible to prevent the backlash of the outer contact 4 from occurring in the insertion hole 53 of the shell 5.

Further, as described above, since the four ribs 42 of the outer contact 4 are pressed onto the inner surface of the insertion hole 53 of the shell 5 due to the press-fitting, it is possible to electrically connect the outer contact 4 and the shell 5 with sureness to achieve a ground reinforcement of the electrical connector 1. The shell 5 is electrically connected to the ground terminals 110 of the circuit board 100 through the ground terminals 55 as described later. Thus, it is possible to surely make the electric potential of the outer contact 4 equal to the ground potential by electrically connecting the outer contact 4 and the shell 5 with sureness. This makes it possible to stabilize the signal transmission characteristics of the electrical connector 1. In the illustrated embodiment, although the four ribs 42 of the outer contact 4 are pressed onto the inner surface of the insertion hole 53 from the viewpoint of the ground reinforcement of the electrical connector 1 and preventing the outer contact 4 from being removed from the shell 5, the present disclosure is not limited thereto. The scope of the present disclosure also involves aspects in which the outer contact 4 and the shell 5 are configured so that at least the four ribs 42 contact with the inner surface of the insertion hole 53.

The stop surface 532 is a flat surface formed in the insertion hole 53 and perpendicular to the insertion and extraction direction of the mating connector 200 (the Z direction). The press-fitting of the outer contact 4 into the insertion hole 53 of the shell 5 is completed when the outer contact 4 abuts against the stop surface 532. A diameter of a portion of the insertion hole 53 positioned closer to the front side than the stop surface 532 of the insertion hole 53 is substantially equal to an outer diameter of the body portion 41 of the outer contact 4. A diameter of a portion of the insertion hole 53 positioned closer to the rear side than the stop surface 532 of the insertion hole 53 is substantially equal to an outer diameter of the cylindrical portion 31 of the lower housing 3L or the upper housing 3U.

As shown in FIG. 21, the two first guide portions 533 are concave portions formed on an upper surface of a base side portion of the insertion hole 53 so as to linearly extend in the insertion and extraction direction of the mating connector 200 (the Z direction). When the cylindrical portion 31 of the lower housing 3L or the upper housing 3U is inserted into the insertion hole 53 of the shell 5 from the base side, the upper two of the four ribs 311 formed on the cylindrical portion 31 are respectively inserted into the two first guide portions 533. With this configuration, it is possible to position the lower housing 3L or the upper housing 3U with respect to the shell 5.

The pair of second guide portions 534 are concave portions formed on both side surfaces of the base side portion of the insertion hole 53 so as to linearly extend in the insertion and extraction direction of the mating connector 200 (the Z direction). When the cylindrical portion 31 of the lower housing 3L or the upper housing 3U is inserted into the insertion hole 53 of the shell 5 from the base side, each of the pair of pressing ribs 312 formed on the outer peripheral surface of the cylindrical portion 31 is inserted into each of the pair of second guide portions 534. With this configuration, it is possible to position the lower housing 3L or the upper housing 3U with respect to the shell 5.

Further, the pair of pressing ribs 312 formed on the lower housing 3L or the upper housing 3U is pressed toward the inner side by the inner surface of the insertion hole 53 (more specifically, by the pair of second guide portions 534) when the lower housing 3L or the upper housing 3U is press-fitted into the insertion hole 53 of the shell 5. Thus, the portions of the cylindrical portion 31 where the pair of pressing ribs 312 are formed are elastically deformed toward the inner side. As a result, since the inner surfaces of the portions where the pair of pressing ribs 312 are formed are pressed against the pair of first protruding portions 27 of the lower contact pin 2L or the upper contact pin 2U, it is possible to lock the lower contact pin 2L in the lower housing 3L or the upper contact pin 2U in the upper housing 3U.

The third guide portion 535 is a concave portion formed on an upper side surface of the base side portion of the insertion hole 53 and between the two first guide portions 533 so as to linearly extend in the insertion and extraction direction of the mating connector 200 (the Z direction). When the cylindrical portion 31 of the lower housing 3L or the upper housing 3U is inserted into the insertion hole 53 of the shell 5 from the base side, the upper locking rib 313 of the pair of locking ribs 313 formed on the outer peripheral surface of the cylindrical portion 31 is inserted into the third guide portion 535. With this configuration, it is possible to position the lower housing 3L or the upper housing 3U with respect to the shell 5.

The pair of reinforcing portions 54 reinforce the root portions of the four ground terminals 55 extending downward from the lower end portion of the body portion 51. The pair of reinforcing portions 54 have a function of increasing twisting strength (strength with respect to load around the Y-axis) of the electrical connector 1 and strength of the body portion 51 with respect to load exerted in the X direction in a state that the electrical connector 1 is attached to the circuit board 100. The pair of reinforcing portions 54 are respectively formed on marginal portions of lower portions (portions located in the −Y direction) of the pair of side walls 512 of the body portion 51 so as to extend from the tip side toward the base side. Each of the pair of reinforcing portions 54 protrudes toward the outside (the X direction side) from the body portion 51 in a planar view viewed from the Z direction. Further, an outer surface of each of the pair of reinforcing portions 54 is located outside of an outer surface of the cover receiving portion 57 formed above each of the pair of reinforcing portions 54. Thus, a thickness (the length in the X direction) of each of the pair of reinforcing portions 54 is larger than a thickness of the cover receiving portion 57.

A lower surface of each of both end portions (in the Z direction) of each of the pair of reinforcing portions 54 is a flat surface which is continuous with a lower surface of the body portion 51. As shown in FIG. 21, it is possible to increase a diameter of each of the four ground terminals 55 by mounting each ground terminal 55 on a continuous surface of the lower surface of the body portion 51 and the lower surface of the end portion of the reinforcing portion 54. With this configuration, it is possible to reinforce the root portions of the four ground terminals 55 and increase the twisting strength (the strength against the load around the Y-axis) of the electrical connector 1 in the state that the electrical connector 1 is mounted on the circuit board 100. Further, it is possible to increase the strength of the body portion 51 of the shell 5 with respect to the load exerted in the X direction. As a result, it is possible to effectively prevent deformation of the shell 5.

Further, each of the pair of reinforcing portions 54 has a concave portion 541 at a base end portion thereof. The concave portion 541 is formed in the base end portion of the reinforcing portion 54. In addition, the concave portion 541 is formed by cutting out an upper portion of the base end portion of the reinforcing portion 54 and is opened toward the base side and the upper side in the illustrated embodiment.

The four ground terminals 55 are respectively connected to the corresponding ground terminals 110 (see FIG. 3) of the circuit board 100. Since the four ribs 42 of the outer contact 4 are pressed onto the inner surface of the insertion hole 53 of the shell 5 due to their own elastic restoring force as described above, the shell 5 and the outer contact 4 are electrically connected to each other. Further, since the shell 5 is electrically connected to the ground terminals 110 through the ground terminals 55, the electric potential of the outer contact 4 electrically connected to the shell 5 becomes equal to the ground potential.

The pair of wall portions 56 are formed on each of the pair of side walls 512 of the body portion 51 for forming the cover receiving portion 57 for receiving each of an after-mentioned pair of protruding pieces 75 of the cover 7. One of the pair of wall portions 56 is formed on the upper side (the +Y direction) of the side wall 512 (an upper wall portion 56) and the other is formed on the lower side (the −Y direction) of the side wall 512 (a lower wall portion 56). The pair of wall portions 56 face each other through the cover receiving portion 57. The lower wall portion 56 of the side wall 512 is formed on an upper surface (a surface in the +Y direction) of the reinforcing portion 54. Each of the pair of wall portions 56 includes an inclined portion 561 extending from a tip end portion of the side wall 512 toward the base side and having a height (the length in the Y direction) gradually increasing from the tip side toward the base side, and a straight portion 562 linearly extending from the base end portion of the inclined portion 561 toward the base side and having a constant height (the length in the Y direction). The tip end surface of the inclined portion 561 is a flat surface perpendicular to the Z direction. An inner surface (the inner surface in the Y direction) of the inclined portion 561 is a flat inclined surface inclined from the tip side toward the base side. The straight portion 562 linearly extends from the base end portion of the inclined portion 561 toward the base side. The cover receiving portion 57 is formed between the pair of wall portions 56.

The cover receiving portion 57 is formed on the outer surface of each of the pair of side walls 512 of the body portion 51 and between the pair of wall portions 56. The cover receiving portion 57 has a function of receiving each of the pair of protruding pieces 75 of the cover 7. The cover receiving portion 57 is defined by the outer surface of the side wall 512 of the body portion 51 and inner surfaces (inner surfaces in the Y direction) of the pair of wall portions 56. It is possible to guide attachment of the cover 7 to the shell 5 by providing the cover receiving portion 575 on the outer surface of each of the pair of side walls 512.

Further, each of the pair of cover receiving portions 57 includes an engagement recess 571 having an upper engagement recess 571*a* and a lower engagement recess 571*b* and extending from a base side portion of the cover receiving portion 57 (from an after-mentioned tip end surface 573) toward the base side, and a thick portion 572 located between the upper engagement recess 571*a* and the lower engagement recess 571*b* in the height direction (the Y direction) and extending from the base side portion of the cover receiving portion 57 toward the base side as shown in FIG. 20.

The upper engagement recess 571*a* and the lower engagement recess 571*b* are respectively located at both end portions of the cover receiving portion 57 in the Y-direction. The upper engagement recess 571*a* and the lower engagement recess 571*b* are spaced apart from each other through the thick portion 572. Each of the upper engagement recess 571*a* and the lower engagement recess 571*b* is formed by cutting out each of both end portions in the Y direction of the outer surface of the cover receiving portion 57. Each of the upper engagement recess 571*a* and the lower engagement recess 571*b* is a thin portion having a thin thickness in the X direction. A bottom surface (a surface in the X direction) of each of the upper engagement recess 571*a* and the lower engagement recess 571*b* is located on the inner side of a surface of the thick portion 572. The thickness (a length in the X direction of the bottom surface) of each of the upper engagement recess 571*a* and the lower engagement recess 571*b* is thinner than a thickness of the thick portion 572.

Further, each of the upper engagement recess 571*a* and the lower engagement recess 571*b* has the tip end surface 573 located on the tip side thereof. The tip end surface 573 is a flat surface perpendicular to the Z direction. The tip end surface 573 engages with an after-mentioned engagement protrusion 76 formed at a base end portion of the protruding piece 75 of the cover 7 to enable attachment of the cover 7 to the shell 5.

The thick portion 572 has a function of reinforcing the base end portions of the pair of side walls 512 of the body portion 51. The thick portion 572 is formed on the base side of the cover receiving portion 57 formed on each of the pair of side walls 512 and substantially in the center of the cover receiving portion 57 in the height direction (the Y direction). The outer surface of the thick portion 572 is a flat surface which is located on the same plane as the outer surface of the cover receiving portion 57. Further, the thick portion 572 is located between the upper engagement recess 571*a* and the lower engagement recess 571*b* in the height direction (the Y direction) and separates the upper engagement recess 571*a* and the lower engagement recess 571*b* from each other. A thickness of the thick portion 572 is thicker than the thicknesses of the bottom portions of the upper engagement recess 571*a* and the lower engagement recess 571*b*. Thus, providing the thick portion 572 in the cover receiving portion 57 enhances the strength of the body portion 51 against load from the X direction. As a result, it is possible to reinforce the base end portion of each of the pair of side walls 512 of the body portion 51 to prevent the deformation of the shell 5.

As shown in FIG. 21, the partition portion 58 is a plate-like portion extending inside the body portion 51 along the insertion and extraction direction of the mating connector 200 (the Z direction) so as to partition the insertion holes 53 adjacent to each other in the width direction. The partition portion 58 has a function of preventing the electromagnetic interference between the two lower contact pins 2L and the electromagnetic interference between the two upper contact pins 2U in the state that the two lower housings 3L and the two upper housings 3U are held in the shell 5.

Further, a press-fitting groove 581 into which the shield member 6 is press-fitted is formed on an inner surface of each of the pair of side walls 512 and the partition portion 58. By inserting the shield member 6 into the press-fitting groove 581, it is possible to prevent the electromagnetic interference between the lower contact pins 2L and the upper contact pins 2U adjacent to each other in the insertion and extraction direction of the mating connector 200 (the Z direction). Further, the partition portion 58 of the shell 5, the shield member 6 and the inner surface of the body portion 51 of the shell 5 define two housing containing sections 59 for respectively containing the two lower housings 3L therein.

Referring back to FIG. 7, the shield member 6 prevents the electromagnetic interference between the lower contact pins 2L and the upper contact pins 2U adjacent to each other in the insertion and extraction direction of the mating connector 200 (the Z direction) as described above when the shield member 6 is press-fitted into the press-fitting groove 581 of the shell 5 from the lower side. The shield member 6 is a plate-like member made of the metal material similar to that of the shell 5. The shield member 6 includes the body portion 61 having a plate-like shape, three press-fitting protrusions 62 formed on the body portion 61 and a terminal portion 63 extending from the body portion 61 toward the lower side. The three press-fitting protrusions 62 are formed so as to align in the width direction of the body portion 61. A central one of the three press-fitting protrusions 62 protrudes toward the tip side. Two press-fitting protrusions 62 located on the left side and right side of the central press-fitting protrusion 62 protrude toward the base side. The three press-fitting protrusions 62 abut against the press-fitting groove 581 of the shell 5 by the shield member 6 press-fitting into the press-fitting groove 581 of the shell 5. With this configuration, it is possible to prevent the shield member 6 from being removed from the press-fitting groove 581 of the shell 5. The terminal portion 63 extends from the body portion 61 toward the lower side and should be connected to a corresponding shield terminal 130 (see FIG. 3) of the circuit board 100.

The cover 7 is attached to the shell 5 and has a function of guiding the coupling between the electrical connector 1 and the mating connector 200. As shown in FIGS. 22 and 23, the cover 7 includes a rectangular cylindrical body portion 71 which opens toward the tip side, the four press-fitting concave portions 72 formed on the base end surface of the body portion 71, the four protrusions 73 respectively formed in the four press-fitting concave portions 72, the pair of positioning protrusions 74 formed on the inner surface of the body portion 71, the pair of protruding pieces 75 extending from the body portion 71 toward the base side, the engagement protrusion 76 having an upper engagement protrusion 76*a* and a lower engagement protrusion 76*b* and extending from a base side edge portion of the inner surface of each of the pair of protruding pieces 75 toward inner side and a receiving portion 77 formed on an upper surface of the body portion 71 for receiving a positioning convex portion 211 (see FIG. 3) of the mating connector 200.

The body portion 71 has a rectangular cylindrical shape which opens toward the tip side. The coupling between the electrical connector 1 and the mating connector 200 is guided when the mating connector 200 is inserted into a tip side opening of the body portion 71.

As shown in FIG. 22, the four press-fitting concave portions 72 are formed on the base end surface of the body portion 71. Each of the four press-fitting concave portions 72 is located at the position corresponding to each of the four positioning concave portions 531 on the base end surface of the cover 7 and has a shape corresponding to the positioning concave portion 531 of the shell 5 described above. When the cover 7 is attached to the shell 5, the four press-fitting concave portions 72 respectively face the four positioning concave portions 531. Each of the four protrusions 73 has a conical shape whose diameter gradually decreases from the tip side toward the base side. Each of the four protrusions 73 is formed in the press-fitting concave portions 72. As described above, in the state in which the outer contact 4 is press-fitted into the insertion hole 53 of the shell 5 and the base end surfaces of the pair of positioning protrusions 43 of the outer contact 4 abut against the corresponding positioning concave portion 531, the tip end surfaces of the pair of positioning protrusions 43 of the outer contact 4 are positioned on substantially the same plane as the tip end surfaces of the corresponding positioning concave portion 531. Further, when the cover 7 is attached to the shell 5, the base end portion of the protrusion 73 is formed so as to abut against the tip end portion of the pair of positioning protrusions 43. With this configuration, the pair of positioning protrusions 43 of the outer contact 4 are sandwiched between the cover 7 and the shell 5 when the cover 7 is attached to the shell 5.

The pair of positioning protrusions 74 are respectively inserted into the pair of relief portions 521 formed on the body portion 51 of the shell to position the cover 7 with respect to the shell 5. The pair of positioning protrusions 74 are formed so as to protrude from X-direction inner surfaces of the body portion 71 toward the inner side. Each of the pair of positioning protrusions 74 has a shape corresponding to the relief portion 521. Thus, the pair of positioning protrusions 74 are respectively contained in the pair of relief portions 521 to position the cover 7 with respect to the shell 5 when the tip side portion of the shell 5 is inserted into the body portion 71 of the cover 7 from the base side of the body portion 71.

The pair of protruding pieces 75 are plate-like portions respectively extending from base end portions of a pair of X-direction opposed side surfaces (wall portions) of the body portion 71 toward the base side. The pair of protruding pieces 75 face each other through a gap therebetween. Each of the protruding pieces 75 has a shape corresponding to the corresponding cover receiving portion 57 of the shell 5 described above. Thus, each of the pair of protruding pieces 75 is contained in each of the pair of cover receiving portions 57 when the cover 7 is attached to the shell 5.

The engagement protrusion 76 engages with the engagement recess 571 formed in the shell 5, so that the cover 7 is attached to the shell 5. The engagement protrusion 76 is tapered portion protruding from the base side edge portion of the inner surface of each of the pair of protruding pieces 75 toward the inner side. The engagement protrusion 76 has the upper engagement protrusion 76*a* formed in an upper portion of the base side edge portion of the inner surface of the protruding piece 75, and the lower engagement protrusion 76*b* formed in a lower portion of the base side end portion of the inner surface of the protruding piece 75. The upper engagement protrusion 76*a* and the lower engagement protrusion 76*b* protrude toward the inner side with being spaced apart from each other in the Y-direction. The upper engagement protrusion 76*a* engages with the upper engagement recess 571*a* formed in the cover receiving portion 57 of the shell 5. The lower engagement protrusion 76*b* engages with the lower engagement recess 571*b* formed in the cover receiving portion 57. This configuration allows the attachment of the cover 7 to the shell 5. Since the upper engagement protrusion 76*a* and the lower engagement protrusion 76*b* have the same configuration except that the positions in the height direction formed at the base side edge portion of the inner surface of the protruding piece 75 are different, the upper engagement protrusion 76*a* will be described in detail as a representative.

The upper engagement protrusion 76*a* includes an inclined portion 761 located on the base side and a flat portion 762 linearly extending from a tip end portion of the inclined portion 761. A base end surface of the inclined portion 761 is continuous with the base end portion of the protruding piece 75. A height (the length in the X direction) of the inclined portion 761 gradually increases from the base side toward the tip side. An inner surface of the inclined portion 761 is an inclined surface inclined from the base side toward the inner side and the tip side. When the cover 7 is attached to the shell 5, the cover receiving portion 57 of the shell 5 slides on the inner surface of the inclined portion 761, and thereby the protruding piece 75 is gradually and elastically deformed toward the outside. The flat portion 762 linearly extends from the tip end portion of the inclined portion 761 and has a constant height from the base side toward the tip side. The tip end surface of the flat portion 762 is a flat surface perpendicular to the Z direction. The tip end surface of the flat portion 762 engages with the tip end surface 573 of the engagement recess 571 formed on the base side of the cover receiving portion 57 of the shell 5, so that the cover 7 is attached to the tip side portion of the shell 5.

The receiving portion 77 is formed on an upper surface of the body portion 71 and has a function of receiving a positioning convex portion 211 of a case 210 of the mating connector 200 (see FIG. 3). The receiving portion 77 includes an opening 771 through which the positioning convex portion 211 of the case 210 of the mating connector 200 is passed, a pair of guide portions 772 for sliding the positioning convex portion 211 of the mating connector 200 and for guiding the coupling between the electrical connector 1 and the mating connector 200, and a stop portion 773 for stopping the positioning convex portion 211 of the case 210 of the mating connector 200.

The opening 771 is a rectangular opening which opens in the insertion and extraction direction of the mating connector 200 (the Z direction). The mating connector 200 is inserted into the electrical connector 1 in a posture that the positioning convex portion 211 of the case 210 of the mating connector 200 is inserted into the opening 771 for positioning the mating connector 200 with respect to the electrical connector 1. The pair of guide portions 772 are plate-like portions extending from the upper surface of the body portion 71 toward the upper side and facing each other. The positioning convex portion 211 of the case 210 of the mating connector 200 slides on inner surfaces of the pair of guide portions 772 for guiding the coupling between the electrical connector 1 and the mating connector 200. The stop portion 773 is a plate-like portion for connecting base end portions of the pair of guide portions 772 to each other. The stop portion 773 is a flat surface perpendicular to the insertion and extraction direction of the mating connector 200 (the Z direction). When the tip end portion of the positioning convex portion 211 of the case 210 of the mating connector 200 abuts against the stop portion 773, the insertion of the mating connector 200 with respect to the electrical connector 1 is restricted.

The electrical connector 1 including the above-described components can be assembled by the following exemplary process. First, the press-fitting tool (for example, the press-fitting tool disclosed in JP-A-2022-149019) is used for respectively press-fitting the two lower contact pins 2L into the insertion holes 314 of the two lower housings 3L. Since the insertion of the two lower contact pins 2L into the insertion holes 314 of the two lower housings 3L is performed in the same manner, a process for press-fitting one of the lower contact pins 2L into the insertion hole 314 of one of the lower housings 3L will be described below as a representative.

First, the contact portion 22 of the lower contact pin 2L is inserted into the insertion hole 314 of the lower housing 3L. Next, the pair of pressing protrusions of the press-fitting tool are brought into contact with the entire areas of the base end surfaces of the pair of press-fitting shoulders 26 of the lower contact pin 2L. Next, the entire areas of the base end surfaces of the pair of press-fitting shoulders 26 of the lower contact pin 2L are respectively pressed by the pair of pressing protrusions of the press-fitting tool for press-fitting the lower contact pin 2L into the insertion hole 314 of the lower housing 3L. When the downwardly extending portion 24 of the lower contact pin 2L contacts with the base end surface of the front plate 321 of the downwardly extending portion 32 of the lower housing 3L, the press-fitting of the lower contact pin 2L into the insertion hole 314 of the lower housing 3L is completed. In the same manner, the two upper contact pins 2U are respectively press-fitted into the insertion holes 314 of the two upper housings 3U.

Next, the four outer contacts 4 are respectively press-fitted into the four insertion holes 53 of the shell 5 from the tip side for attaching the four outer contacts 4 to the shell 5. Since the press-fitting of the four outer contacts 4 into the four insertion holes 53 of the shell 5 is performed in the same manner, a process for press-fitting one of the outer contacts 4 into one of the insertion holes 53 of the shell 5 will be described below as a representative. The outer contact 4 is press-fitted into the insertion hole 53 of the shell 5 from the tip side in the posture that the pair of positioning protrusions 43 of the outer contact 4 are located in the positioning concave portion 531 of the shell 5. When the outer contact 4 is press-fitted into the insertion hole 53 of the shell 5, the four ribs 42 of the outer contact 4 contact with the inner surface of the insertion hole 53 of the shell 5, and thereby the outer contact 4 is fixed in the insertion hole 53 of the shell 5. Further, since the four ribs 42 of the outer contact 4 are pressed onto the inner surface of the insertion hole 53 of the shell 5 by the press-fitting, the shell 5 and the outer contact 4 are electrically connected to each other. Since the shell 5 is connected to the ground terminals 110 of the circuit board 100 through the ground terminals 55, the electric potential of the outer contact 4 electrically connected to the shell 5 becomes equal to the ground potential.

Next, the two lower housings 3L into which the two lower contact pins 2L are respectively press-fitted are respectively press-fitted into the corresponding insertion holes 53 of the shell 5 from the base side. Since the press-fitting of the two lower housings 3L into the corresponding insertion holes 53 of the shell 5 is performed in the same manner, a process of press-fitting one of the lower housings 3L into one of the insertion holes 53 of the shell 5 will be described below as a representative. First, the cylindrical portion 31 of the lower housing 3L is press-fitted into the corresponding insertion hole 53 of the shell 5 from the base side. Next, in the state that the body portion 41 of the outer contact 4 is press-fitted into the insertion holes 53 from the tip side, the cylindrical portion 31 is press-fitted into the body portion 41 from the base side. The press-fitting of the lower housing 3L into the insertion hole 53 and the body portion 41 are completed when the tip end surface of the front plate 321 of the lower housing 3L contacts with the inner surface of the body portion 51 of the shell 5. In the state that the press-fitting of the lower housing 3L into the insertion hole 53 of the shell 5 is completed, the four ribs 311 formed on the cylindrical portion 31 of the lower housing 3L contact with the inner surface of the insertion hole 53 of the shell 5. Thus, the cylindrical portion 31 of the lower housing 3L is fixed in the insertion hole 53 of the shell 5.

Further, as described above, when the cylindrical portion 31 of the lower housing 3L is inserted into the insertion hole 53 of the shell 5, the pair of pressing ribs 312 of the lower housing 3L are pressed by the inner surface of the insertion hole 53 (the inner surface of the pair of second guide portions 534), so that the portions of the cylindrical portion 31 where the pair of pressing ribs 312 are formed are elastically deformed toward the inner side. As a result, the inner surfaces of the portions of the cylindrical portion 31 where the pair of pressing ribs 312 are formed are pressed against the pair of first protruding portions 27 of the lower contact pin 2. Thus, at least the parts of the pair of first protruding portions 27 are held by the inner surface of the insertion hole 314 of the lower housing 3L so as to be embedded in the inner surface of the insertion hole 314. Thereafter, when the lower housing 3L is held by the shell 5, a state in which the pair of pressing ribs 312 contact with the inner surface of the insertion hole 53 is maintained and a state in which the portions of the cylindrical portion 31 where the pair of pressing ribs 312 are formed are elastically deformed toward the inner side is also maintained. Since the pair of first protruding portions 27 are held by the inner surface of the insertion hole 314 so as to be embedded in the inner surface of the insertion hole 314, the pair of first protruding portions 27 are locked in the inner surface of the insertion hole 314 even when the strong force is applied in the insertion and extraction direction of the mating connector 200 (the Z direction). As a result, it is possible to effectively prevent the lower contact pin 2L from being removed from the lower housing 3L.

Further, as described above, each of the pair of locking ribs 313 of the lower housing 3L is compressed by the inwardly extending portion 442 of each of the pair of locking protrusions 44 of the outer contact 4 and is deformed toward the inner side (see FIG. 19) in the state that the press-fitting of the cylindrical portion 31 of the lower housing 3L into the body portion 41 of the outer contact 4 is completed and the outer contact 4 covers the cylindrical portion 31. As a result, each of the pair of locking ribs 313 firmly engages with each of the pair of locking protrusions 44. With this configuration, it is possible to suppress the backlash of the cylindrical portion 31 in the body portion 41.

Further, in particular, since the tip end surface 443 of the locking protrusion 44 of the outer contact 4 is a flat surface substantially perpendicular to the insertion and extraction direction of the mating connector 200, the engagement between the tip end portion of the inwardly extending portion 442 and the tip end surface 443 of the locking protrusion 44 and the locking rib 313 of the lower housing 3L provides the strong resistance to the movement of the cylindrical portion 31 toward the base side in the body portion 41. Thus, the engagement between the tip end portion of the inwardly extending portion 442 and the tip end surface 443 of the locking protrusion 44 and the pair of locking ribs 313 prevents the cylindrical portion 31 from being moved toward the base side. As a result, it is possible to effectively prevent the cylindrical portion 31 from being removed from the body portion 41.

Next, the shield member 6 is press-fitted into the press-fitting groove 581 of the shell 5 from the lower side. With this operation, the two housing containing sections 59 for respectively containing the two lower housings 3L therein are defined by the partition portion 58 of the shell 5, a tip end surface of the shield member 6 and the inner surface of the body portion 51 of the shell 5. In a state that the two lower housings 3L are respectively contained in the two housing containing sections 59, the lower contact pins 2L respectively inserted into the lower housings 3L are surrounded by metallic conductive members, that is the shell 5 and the shield member 6. Thus, it is possible to prevent the electromagnetic interference with respect to each of the lower contact pins 2L.

Next, each of the two upper housings 3U is press-fitted into the corresponding insertion hole 53 of the shell 5 and the body portion 41 of the corresponding outer contact 4 from the base side in the same manner as the press-fitting of the two lower housings 3L into the corresponding insertion holes 53 of the shell 5 and the body portion 41 of the corresponding outer contact 4. At this time, the pair of pressing ribs 312 of the upper housing 3U are pressed by the inner surface of the insertion hole 53 (the inner surfaces of the pair of second guide portions 534), and thereby the portions of the cylindrical portion 31 where the pair of pressing ribs 312 are formed are elastically deformed toward the inner side in the same way as the lower housing 3L. Thus, the inner surfaces of the portions where the pair of pressing ribs 312 are formed are pressed against the pair of first protruding portions 27 of the upper contact pin 2U. As a result, at least the parts of the pair of first protruding portions 27 are held by the inner surface of the insertion hole 314 of the upper housing 3U so as to be embedded in the inner surface of the insertion hole 314. Further, each of the pair of locking ribs 313 of the upper housing 3U is compressed by the inwardly extending portion 442 of each of the pair of locking protrusions 44 of the outer contact 4, thereby deforming toward the inner side. As a result, each of the pair of locking ribs 313 firmly engages with each of the pair of locking protrusions 44.

The partition portion 58 of the shell 5, the base surface of the shield member 6 and the inner surface of the body portion 51 of the shell 5 define two housing containing sections 59 for respectively containing the two upper housings 3U. In the state that the two upper housings 3U respectively contained in the two housing containing sections 59, the upper contact pins 2U respectively inserted into the upper housings 3U are surrounded by the metallic conductive members, that is the shell 5 and the shield member 6. Thus, it is possible to prevent the electromagnetic interference with respect to each of the upper contact pins 2U.

Finally, the cover 7 is attached to the shell 5 from the tip side. Specifically, the tip side portion of the shell 5 is press-fitted into the base side of the cover 7 in a posture that the pair of protruding pieces 75 of the cover 7 are respectively inserted into the pair of cover receiving portions 57 of the shell 5. At this time, the pair of cover receiving portions 57 respectively slide on the inclined surfaces of the inclined portions 761 of the pair of engagement protrusions 76 of the cover 7, and thereby the protruding pieces 75 are elastically deformed and opened toward the outer side as the shell 5 is inserted into the cover 7. When the insertion of the shell 5 into the cover 7 progresses and each of the pair of engagement protrusions 76 exceeds the tip end surface 573 of the engagement recess 571 of each of the pair of cover receiving portions 57, the pair of protruding pieces 75 are elastically restored toward the inner side. As a result, the tip end surface of the flat portion 762 of the engagement protrusion 76 engages with the tip end surface 573 of the cover receiving portion 57 of the shell 5 by the snap-fitting. This snap-fitting engagement completes the attachment of the cover 7 to the tip side portion of the shell 5. Although one example of an assembling procedure for the electrical connector 1 has been described in detail in the above description, the assembling procedure for the electrical connector 1 of the present disclosure is not limited thereto. The electrical connector 1 can be assembled by an arbitrary suitable assembling procedure.

FIG. 24 is a YZ plane cross-sectional view containing the lower contact pin 2L and the upper contact pin 2U in the state that the electrical connector 1 and the mating connector 200 are coupled with each other. As shown in FIG. 24, when the mating connector 200 is inserted into the electrical connector 1 from the tip side, and the electrical connector 1 and the mating connector 200 are coupled with each other. In this state, the contact portions 22 of the lower contact pins 2L and the upper contact pins 2U of the electrical connector 1 respectively contact with the corresponding contact pins 220 of the mating connector 200. The contact pins 220 of the mating connector 200 are respectively connected to the core wires 310 of the corresponding coaxial cables 300. Thus, in the state that the electrical connector 1 and the mating connector 200 are coupled with each other, the lower contact pins 2L and the upper contact pins 2U of the electrical connector 1 are electrically connected to the core wires 310 of the corresponding coaxial cables 300 through the corresponding contact pins 220 of the mating connector 200, respectively.

Further, the outer contacts 4 of the electrical connector 1 respectively contact with the corresponding outer contacts 230 of the mating connector 200. The outer contacts 230 of the mating connector 200 are respectively connected to the outer conductor layers 330 of the corresponding coaxial cables 300. Thus, in the state that the electrical connector 1 and the mating connector 200 are coupled with each other, the outer contacts 4 of the electrical connector 1 are electrically connected to the outer conductor layers 330 of the corresponding coaxial cable 300 through the corresponding outer contacts 230 of the mating connector 200, respectively. With this configuration, the electrical connector 1 is coaxially connected to the four coaxial cables 300 through the mating connector 200.

The electrical connector 1 of the present disclosure is configured so that each of the lower housing 3L and the upper housing 3U includes the pressing rib 312 formed on the side portion of the outer peripheral surface of the cylindrical portion 31 at the position corresponding to the first protruding portion 27 of the lower contact pin 2L or the upper contact pin 2U as described above. Thus, when the lower housing 3L or the upper housing 3U is press-fitted into the insertion hole 53 of the shell 5, the pressing rib 312 is pressed toward the inner side by the inner surface of the insertion hole 53, and thereby the portion of the cylindrical portion 31 where the pressing rib 312 is formed is elastically deformed toward the inner side. Thus, the portion of the cylindrical portion 31 where the pressing rib 312 is formed is pressed against the first protruding portion 27 of the lower contact pin 2L or the upper contact pin 2U. As a result, at least the part of the first protruding portion 27 is held by the inner surface of the cylindrical portion 31 so as to be embedded in the inner surface of the cylindrical portion 31 of the lower housing 3L or the upper housing 3U. Therefore, it is possible to increase the locking force of the lower contact pin 2L or the upper contact pin 2U in the insertion hole 314.

Further, the electrical connector 1 of the present disclosure is configured so that each of the lower housing 3L and the upper housing 3U includes the locking rib 313 formed on the outer peripheral surface of the cylindrical portion 31 and formed at the portion covered with the outer contact 4. Further, the electrical connector 1 of the present disclosure is configured so that the outer contact 4 includes the locking protrusion 44 formed on the inner surface of the body portion 41 at the position corresponding to the locking rib 313 so as to protrude toward the inner side. With this configuration, the locking rib 313 is compressed by the inwardly extending portion 442 of the locking protrusion 44. As a result, the locking protrusion 44 firmly engages with the locking rib 313. Thus, it is possible to prevent the lower housing 3L or the upper housing 3U from being moved toward the insertion and extraction direction of the mating connector 200 (the Z direction) in the body portion 41. With this configuration, it is possible to effectively prevent the cylindrical portion 31 of the lower housing 3L or the upper housing 3U from being removed from the body portion 41.

Further, the electrical connector 1 of the present disclosure is configured so that each of the pair of wall portions 322 of the downwardly extending portion 32 of the lower housing 3L or the upper housing 3U includes the locking piece 323 which can be elastically deformed toward the inner side. Thus, when the cylindrical portion 31 of the lower housing 3L or the upper housing 3U is inserted into the insertion hole 53 of the shell 5, the outer surface of the locking piece 323 of the lower housing 3L or the upper housing 3U contacts the inner surface of the body portion 51 of the shell 5, and thereby the locking piece 323 is elastically deformed toward the inner side. Thus, the inner surface of the locking piece 323 supports the downwardly extending portion 24 of the lower contact pin 2L or the upper contact pin 2U from the base side. With this configuration, it is possible to effectively prevent the lower contact pin 2L or the upper contact pin 2U from being removed from the lower housing 3L or the upper housing 3U.

Further, the electrical connector 1 of the present disclosure is configured so that the shell 5 includes the reinforcing portion 54 formed on the outer peripheral surface of each of the pair of side walls 512 of the body portion 51 of the shell 5 and formed at a portion adjacent to each of the root portions of the four ground terminals 55 (the +Y direction side of the four ground terminals 55) so as to protrude from the outer peripheral surface of each of the pair of side walls 512 toward the outside. Thus, the root portions of the four ground terminals 55 are reinforced by the reinforcing portions 54. With this configuration, it is possible to increase the twist strength (the strength against load around the Y-axis) of the electrical connector 1 in the state that the electrical connector 1 is mounted on the circuit board 100. Further, since each of the pair of side walls 512 is reinforced by the reinforcing portion 54, it is possible to increase the strength of the body portion 51 against load exerted in the X direction.

Further, the electrical connector 1 of the present disclosure includes the thick portion 572 between the upper engagement recess 571*a* and the lower engagement recess 571*b* of the engagement recess 571 which are the thin portions formed at the base end portion of the cover receiving portion 57 of each of the pair of side walls 512 of the shell 5. Thus, the base side of the cover receiving portion 57 is reinforced by the thick portion 572, and thereby it is possible to increase the strength of the body portion 51 of the shell 5 against the load exerted in the X direction.

Although the electrical connector of the present disclosure has been described with reference to the illustrated embodiment, the present disclosure is not limited thereto. Each configuration of the present disclosure can be replaced with arbitrary configuration capable of performing the same or similar function, or arbitrary configuration can be added to each configuration of the present disclosure.

A person having ordinary skills in the art and the technique pertaining to the present disclosure may modify the configuration of the electrical connector of the present disclosure described above without meaningfully departing from the principle, the spirit and the scope of the present disclosure and the electrical connector having the modified configuration is also involved in the scope of the present disclosure.

In addition, the number and types of the components of the electrical connector shown in the drawings are merely illustrative example and the present disclosure is not necessarily limited thereto. An aspect in which any component is added or combined or any component is omitted without departing from the principle and intent of the present disclosure is also involved within the scope of the present disclosure.

Figure 25:
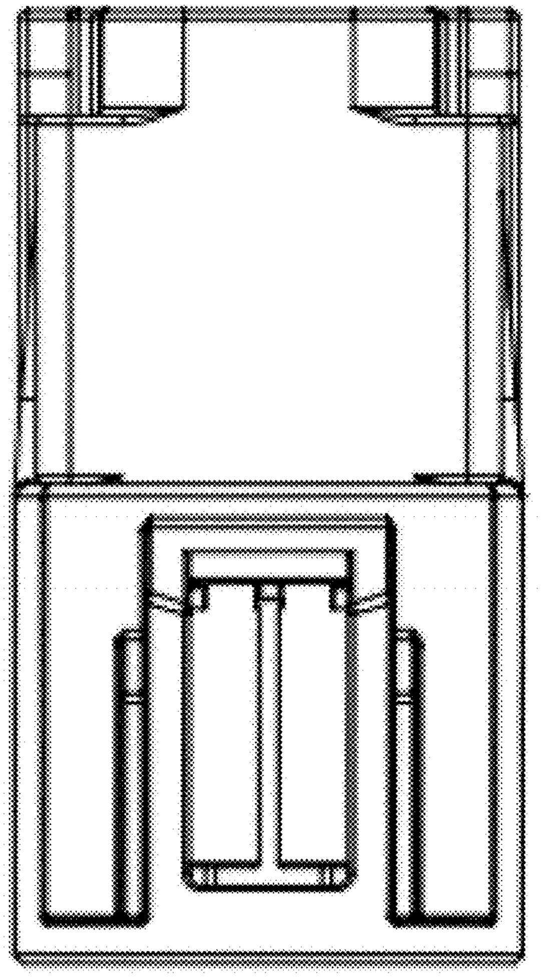
FIG. 25 is a top view of the electrical connector of the present disclosure.
Figure 26:
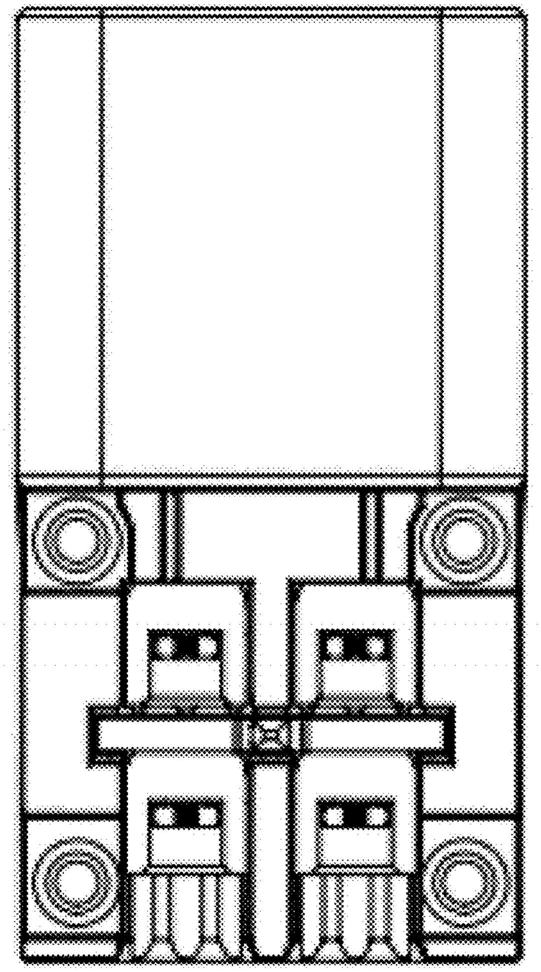
FIG. 26 is a bottom view of the electrical connector of the present disclosure.
Figure 27:
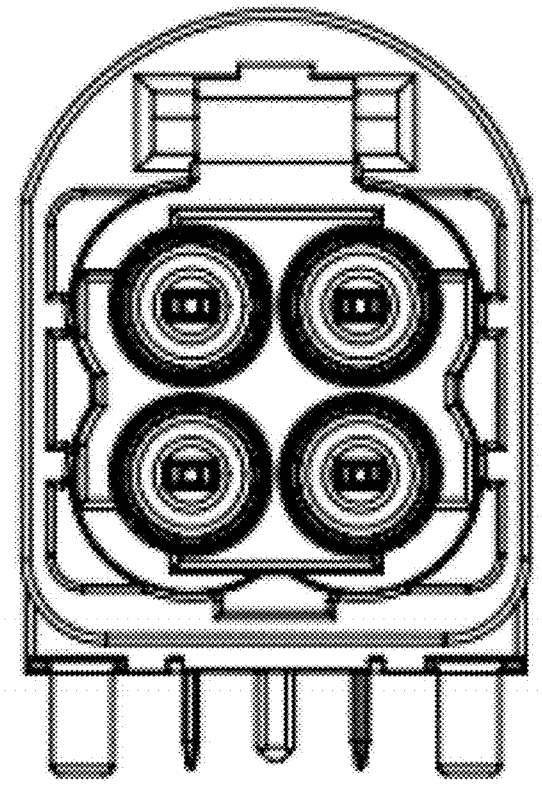
FIG. 27 is a front view of the electrical connector of the present disclosure.
Figure 28:
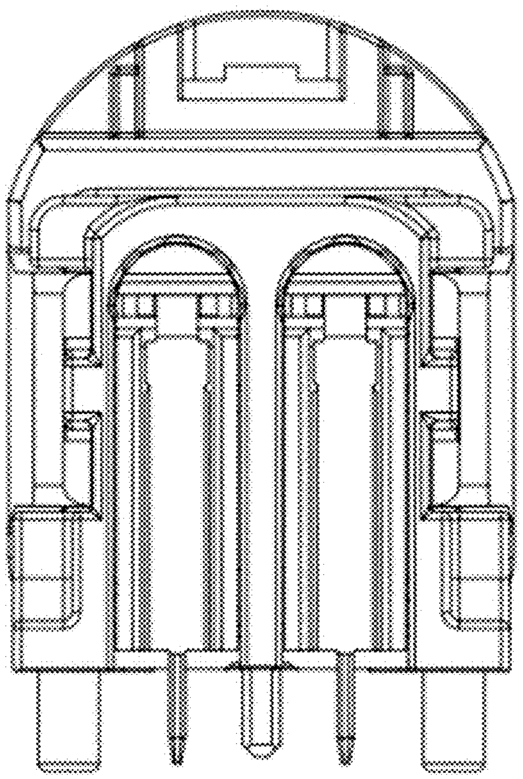
FIG. 28 is a rear view of the electrical connector of the present disclosure.
Figure 29:
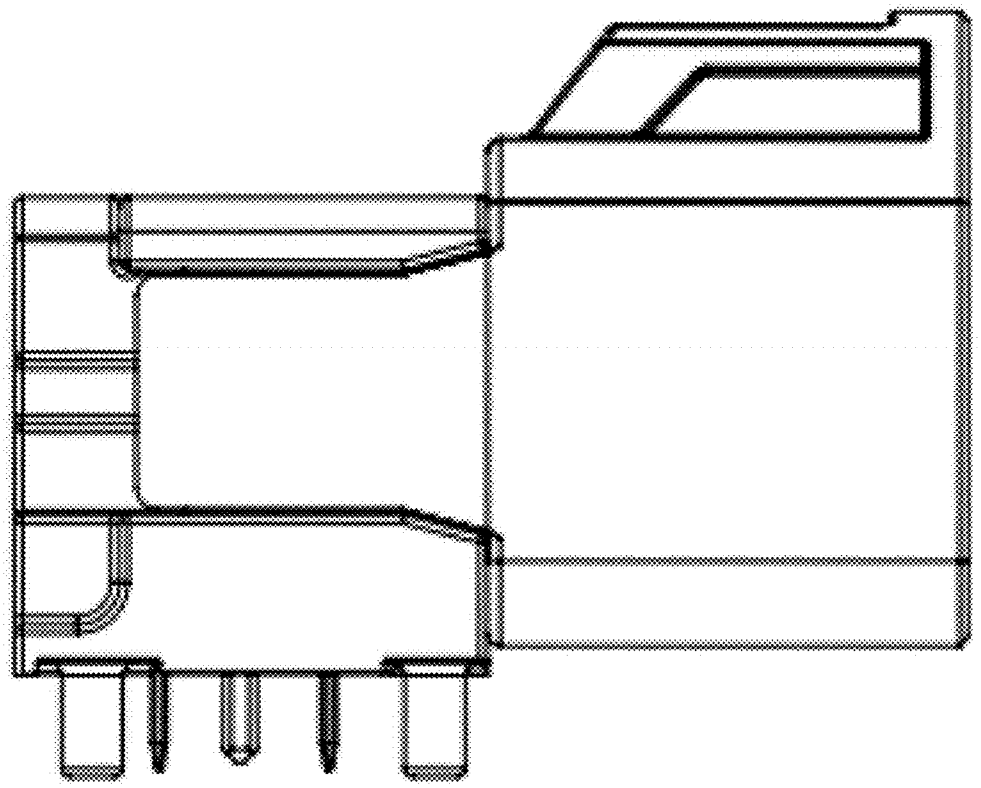
FIG. 29 is a left side view of the electrical connector of the present disclosure.
Figure 30:
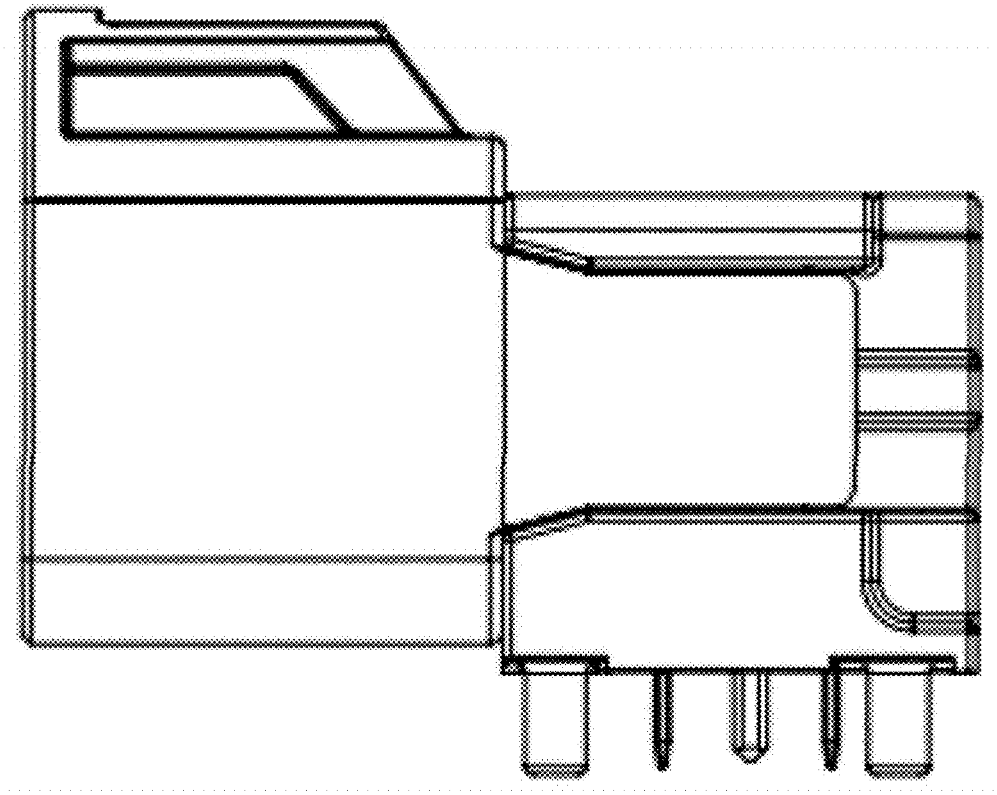
FIG. 30 is a right side view of the electrical connector of the present disclosure.

In addition, FIGS. 25 to 30 show six side views of the electrical connector according to the embodiment of the present disclosure for reference. FIG. 25 is a top view of the electrical connector of the present disclosure. FIG. 26 is a bottom view of the electrical connector of the present disclosure. FIG. 27 is a front view of the electrical connector of the present disclosure. FIG. 28 is a rear view of the electrical connector of the present disclosure. FIG. 29 is a left side view of the electrical connector of the present disclosure. FIG. 30 is a right side view of the electrical connector of the present disclosure.

The invention claimed is:

1. An electrical connector which can be coupled with a mating connector inserted from a tip side thereof, comprising:

at least one contact pin;

at least one insulating housing for containing the at least one contact pin therein;

at least one metallic outer contact for covering the at least one housing; and a metallic shell for holding the at least one contact pin, the at least one housing and the at least one outer contact, wherein the at least one contact pin includes:

a horizontally extending portion which is located in the at least one housing and linearly extends in an insertion and extraction direction of the mating connector, and at least one protruding portion which extends from a side portion of the horizontally extending portion in the at least one housing in a width direction perpendicular to the insertion and extraction direction of the mating connector, wherein the at least one housing includes:

a cylindrical portion which linearly extends in the insertion and extraction direction of the mating connector and contains the horizontally extending portion of the at least one contact pin therein, and at least one pressing rib formed on an outer peripheral surface of the cylindrical portion at a position corresponding to the at least one protruding portion of the at least one contact pin, wherein the shell includes:

a body portion, and at least one insertion hole which passes through the body portion in the insertion and extraction direction of the mating connector and into which the cylindrical portion of the at least one housing is inserted, and wherein when the cylindrical portion of the at least one housing is inserted into the at least one insertion hole of the shell, the at least one pressing rib of the at least one housing is pressed by an inner surface of the at least one insertion hole of the shell, and thereby a portion of the cylindrical portion of the at least one housing where the at least one pressing rib is formed is elastically deformed toward the inner side and is pressed against the at least one protruding portion of the at least one contact pin to lock the at least one contact pin in the at least one housing.

2. The electrical connector as claimed in claim 1, wherein the at least one pressing rib of the cylindrical portion of the at least one housing linearly extends in the insertion and extraction direction of the mating connector on the outer peripheral surface of the cylindrical portion and is formed so as to protrude from the outer peripheral surface of the cylindrical portion toward the outside.

3. The electrical connector as claimed in claim 2, wherein the at least one pressing rib has a substantially semicircular shape in a planar view viewed from the insertion and extraction direction of the mating connector.

4. The electrical connector as claimed in claim 1, wherein the at least one housing further includes at least one locking rib which is formed on the outer peripheral surface of the cylindrical portion at a portion covered with the at least one outer contact, wherein the at least one outer contact includes at least one locking protrusion which is formed on an inner peripheral surface thereof at a position corresponding to the at least one locking rib of the at least one housing so as to protrude toward the inner side, and wherein the at least one locking rib of the at least one housing engages with the at least one locking protrusion of the at least one outer contact in a state that the at least one outer contact covers the at least one housing.

5. The electrical connector as claimed in claim 4, wherein the at least one locking protrusion of the at least one outer contact has a base end portion formed so as to be continuous with the inner peripheral surface of the at least one outer contact, and an inwardly extending portion obliquely extending from the base end portion toward the tip side and the inner side, and wherein the at least one locking rib of the at least one housing is compressed by the inwardly extending portion of the at least one locking protrusion of the at least one outer contact and engages with the at least one locking protrusion of the at least one outer contact in the state that the at least one outer contact covers the at least one housing.

6. The electrical connector as claimed in claim 1, wherein the electrical connector further comprises a cover attached to the shell for guiding a coupling between the electrical connector and the mating connector, wherein the body portion of the shell has a pair of side walls each having a base end portion in which an engagement recess is formed, and a thick portion formed so as to extend from a bottom surface of each engagement recess toward the outside, wherein the cover includes a cylindrical body portion, a pair of protruding pieces respectively extending from the pair of side walls of the body portion toward a base side, and an engagement protrusion extending from each of the pair of protruding pieces toward the inner side, and wherein the engagement protrusion of each of the pair of protruding pieces of the cover engages with the engagement recess of each of the pair of side walls of the body portion of the shell, and thereby the cover is attached to the shell.

7. The electrical connector as claimed in claim 6, wherein each engagement recess of the shell includes an upper engagement recess linearly extending in the insertion and extraction direction of the mating connector, and a lower engagement recess linearly extending in the insertion and extraction direction of the mating connector and located below the upper engagement recess, and wherein each thick portion of the shell linearly extends in the insertion and extraction direction of the mating connector and is located between the upper engagement recess and the lower engagement recess in a height direction perpendicular to the insertion and extraction direction of the mating connector.

8. The electrical connector as claimed in claim 7, wherein each engagement protrusion of the cover includes an upper engagement protrusion formed in an upper portion of a base end portion of each of the pair of protruding pieces and a lower engagement protrusion formed in a lower portion of the base end portion of each of the pair of protruding pieces, wherein the upper engagement protrusion and the lower engagement protrusion are spaced apart from each other in the height direction perpendicular to the insertion and extraction direction of the mating connector, and wherein the upper engagement protrusion engages with the upper engagement recess of the shell and the lower engagement protrusion engages with the lower engagement recess of the shell.

9. The electrical connector as claimed in claim 1, wherein the shell includes at least one ground terminal formed so as to extend from the body portion of the shell toward the outside and a pair of reinforcing portions respectively formed on an outer peripheral surface of the body portion at a portion adjacent to the at least one ground terminal so as to protrude from the outer peripheral surface of the body portion of the shell toward the outside.

10. The electrical connector as claimed in claim 9, wherein the at least one ground terminal is formed so as to extend from the body portion toward the lower side, and wherein each of reinforcing portions is formed in a lower portion of the outer peripheral surface of the body portion so as to protrude toward the outside.

11. The electrical connector as claimed in claim 1, wherein the at least one contact pin further includes:

a contact portion which linearly extends from a tip end portion of the horizontally extending portion toward the tip side so as to be exposed from the at least one housing, a connection portion which is curved from a base end portion of the horizontally extending portion so as to extend toward a lower side, and a downwardly extending portion which linearly extends from a lower end portion of the connection portion toward the lower side, wherein the at least one housing further includes a downwardly extending portion which extends from a base end portion of the cylindrical portion toward the lower side and contains the downwardly extending portion of the at least one contact pin therein, wherein the downwardly extending portion of the at least one housing includes:

a front plate which extends from a lower portion of a base end surface of the cylindrical portion toward the lower side, and a pair of wall portions which respectively extend from both width-direction edges of the front plate, and wherein the pair of wall portions of the at least one housing support the downwardly extending portion of the at least one contact pin from the base side and lock the at least one contact pin in the at least one housing in a state that the at least one contact pin is contained in the at least one housing.

12. The electrical connector as claimed in claim 11, wherein each of the pair of wall portions of the downwardly extending portion of the at least one housing has a locking piece which extends from the both width-direction edges of the front plate toward the base side and can be elastically deformed toward the inner side, wherein the locking piece includes:

an inner surface which linearly extends toward the base side, and an outer surface which obliquely extends toward the base side and the outer side, wherein a width of the locking piece gradually increases from the tip side toward the base side, and wherein when the cylindrical portion of the at least one housing is inserted into the at least one insertion hole of the shell, the outer surface of the locking piece of the at least one housing contacts with the inner surface of the body portion of the shell and the locking piece is elastically deformed toward the inner side, and thereby the inner surface of the locking piece contacts with the downwardly extending portion of the at least one contact pin from the base side to lock the at least one contact pin in the at least one housing.

* * * * *